(12) United States Patent
Fry et al.

(10) Patent No.: US 11,949,263 B2
(45) Date of Patent: *Apr. 2, 2024

(54) PORTABLE POWER SUPPLY

(71) Applicant: MILWAUKEE ELECTRIC TOOL CORPORATION, Brookfield, WI (US)

(72) Inventors: Paul Fry, Sussex, WI (US); Kyle Harvey, Wauwatosa, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 17/967,185

(22) Filed: Oct. 17, 2022

(65) Prior Publication Data

US 2023/0039839 A1 Feb. 9, 2023

Related U.S. Application Data

(63) Continuation of application No. 17/013,988, filed on Sep. 8, 2020, now Pat. No. 11,495,990, which is a
(Continued)

(51) Int. Cl.
*H02J 7/00* (2006.01)
*H02B 1/26* (2006.01)
(Continued)

(52) U.S. Cl.
CPC .............. *H02J 7/0042* (2013.01); *H02B 1/26* (2013.01); *H02B 1/52* (2013.01); *H02J 7/00036* (2020.01); *H02J 7/00047* (2020.01); *H02J 7/0013* (2013.01); *H02J 7/0025* (2020.01); *H02J 7/0044* (2013.01); *H02J 7/0045* (2013.01); *H02J 7/0047* (2013.01); *H02J 7/0049* (2020.01); *H02J 7/005* (2020.01);
(Continued)

(58) Field of Classification Search
CPC .............................. H02J 7/0013; H02J 7/0042
See application file for complete search history.

(56) References Cited

U.S. PATENT DOCUMENTS 4,161,682 A 7/1979 Corvette
4,595,841 A 6/1986 Yaguchi
(Continued)

*Primary Examiner* — Adi Amrany
(74) *Attorney, Agent, or Firm* — Michael Best & Friedrich LLP

(57) ABSTRACT

A portable power source includes a housing and a battery receptacle supported by the housing. The battery receptacle is configured to receive a battery. The portable power source also includes a first power tool battery pack port that is configured to receive a first power tool battery pack. The portable power source further includes a charging circuit coupled to the battery receptacle and the power tool battery pack, and an inverter. The charging circuit is configured to receive power from the battery receptacle and to provide power to the power tool battery pack port. The inverter includes a DC input coupled to the battery receptacle, inverter circuitry, and an AC output. The inverter circuitry is configured to receive power from the battery receptacle via the DC input, invert DC power received from the battery receptacle to AC power, and provide the AC power to the AC output.

20 Claims, 24 Drawing Sheets

Related U.S. Application Data continuation of application No. 16/040,339, filed on Jul. 19, 2018, now Pat. No. 10,811,885, which is a continuation of application No. 14/569,049, filed on Dec. 12, 2014, now Pat. No. 10,044,197.

(60) Provisional application No. 61/944,819, filed on Feb. 26, 2014, provisional application No. 61/915,483, filed on Dec. 12, 2013.

(51) Int. Cl.
*H02B 1/52* (2006.01)
*H02J 7/34* (2006.01)
*H01M 10/42* (2006.01)
*H02J 7/35* (2006.01)

(52) U.S. Cl.
CPC ......... *H02J 7/342* (2020.01); *H01M 10/4257* (2013.01); *H02J 7/35* (2013.01); *H02J 2207/40* (2020.01); *H02J 2310/22* (2020.01)

(56) References Cited

U.S. PATENT DOCUMENTS

| | | |
|---|---|---|
| 4,902,955 A | 2/1990 | Manis et al. |
| 5,077,513 A | 12/1991 | Dea et al. |
| 5,083,076 A | 1/1992 | Scott |
| 5,549,984 A | 8/1996 | Dougherty |
| 6,127,798 A | 10/2000 | Lansang et al. |
| 6,305,185 B1 | 10/2001 | Sloan |
| 6,799,993 B2 | 10/2004 | Krieger et al. |
| 7,018,233 B1 | 3/2006 | Griffin, III et al. |
| 7,188,491 B2 | 3/2007 | Donald, II et al. |
| 7,309,928 B2 | 12/2007 | Grant et al. |
| 7,573,229 B2 | 8/2009 | Arakelian |
| 8,076,900 B1 | 12/2011 | Brown |
| 8,415,924 B2 | 4/2013 | Matthias et al. |
| 8,604,752 B2 | 12/2013 | Cole, Jr. et al. |
| 9,153,978 B2 | 10/2015 | Reade et al. |
| 9,341,403 B2 | 5/2016 | Conrad et al. |
| 9,780,583 B2 | 10/2017 | Furui et al. |
| 2001/0043052 A1 | 11/2001 | Griffey et al. |
| 2003/0090234 A1 | 5/2003 | Glasgow et al. |
| 2004/0263118 A1 | 12/2004 | Breen et al. |
| 2005/0225288 A1 | 10/2005 | Cole, Jr. et al. |
| 2006/0071634 A1 | 4/2006 | Meyer et al. |
| 2007/0019453 A1 | 1/2007 | Pierce |
| 2007/0024236 A1 | 2/2007 | Arakelian |
| 2007/0024237 A1* | 2/2007 | Cole ................ A45C 15/00 320/107 |
| 2007/0273325 A1 | 11/2007 | Krieger et al. |
| 2007/0285049 A1 | 12/2007 | Krieger et al. |
| 2008/0265678 A1 | 10/2008 | Brotto et al. |
| 2009/0284022 A1 | 11/2009 | Usselman et al. |
| 2009/0295169 A1 | 12/2009 | Usselman et al. |
| 2010/0102772 A1 | 4/2010 | Smith |
| 2011/0101794 A1 | 5/2011 | Schroeder et al. |
| 2012/0091944 A1 | 4/2012 | Rogers |
| 2012/0104991 A1 | 5/2012 | Suzuki et al. |
| 2013/0241488 A1 | 9/2013 | Dao |
| 2015/0145476 A1 | 5/2015 | Toya |
| 2016/0009232 A1 | 1/2016 | Budny |
| 2016/0099575 A1 | 4/2016 | Velderman et al. |

* cited by examiner

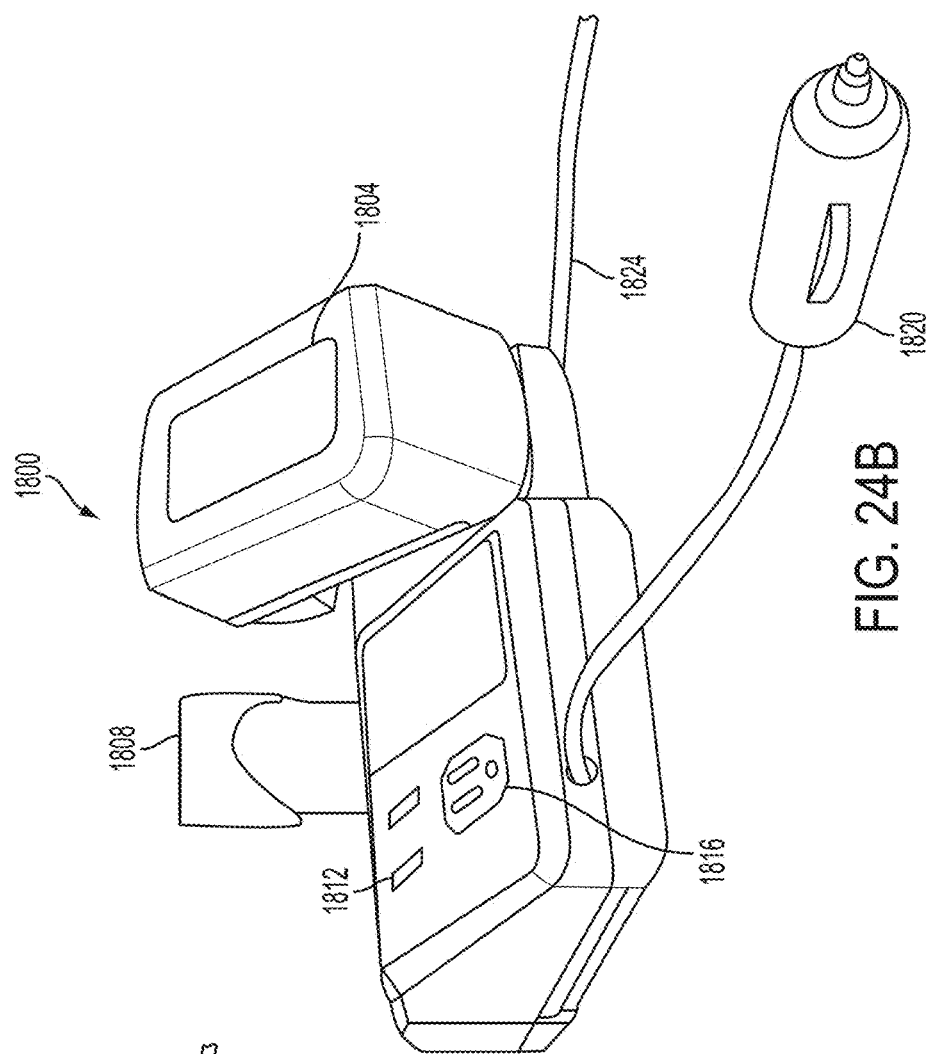
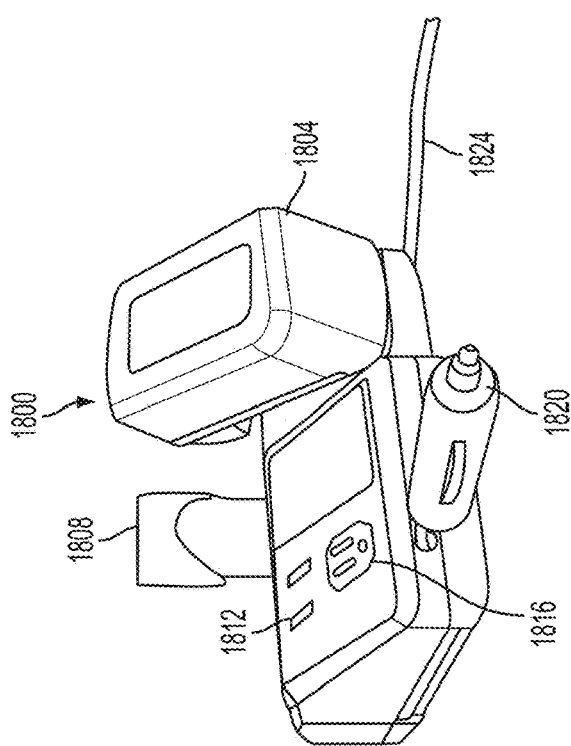
FIG. 24B
FIG. 24A

PORTABLE POWER SUPPLY

RELATED APPLICATIONS

This application is a continuation of U.S. patent application Ser. No. 17/013,988, filed Sep. 8, 2020, now U.S. Pat. No. 11,495,990, which is a continuation of U.S. patent application Ser. No. 16/040,339, filed Jul. 19, 2018, now U.S. Pat. No. 10,811,885, which is a continuation of U.S. patent application Ser. No. 14/569,049, filed Dec. 12, 2014, now U.S. Pat. No. 10,044,197, which claims the benefit of U.S. Provisional Patent Application No. 61/915,483, filed Dec. 12, 2013, and to U.S. Provisional Patent Application No. 61/944,819, filed Feb. 26, 2014, and the entire content of each of which is hereby incorporated by reference.

FIELD OF INVENTION

The present invention relates to portable power supplies and battery chargers.

SUMMARY

In one embodiment, the invention provides a portable power source including a housing and a battery receptacle supported by the housing. The battery receptacle is configured to receive a battery. The portable power source also includes a first power tool battery pack port supported by the housing. The first power tool battery pack port is configured to receive a first power tool battery pack. The portable power source further includes a charging circuit coupled to the battery receptacle and the power tool battery pack, and an inverter. The charging circuit is configured to receive power from the battery receptacle and to provide power to the power tool battery pack port. The inverter includes a DC input coupled to the battery receptacle, inverter circuitry, and an AC output. The inverter circuitry is configured to receive power from the battery receptacle via the DC input, invert DC power received from the battery receptacle to AC power, and provide the AC power to the AC output.

In another embodiment the invention provides a portable power source including a housing, a battery supported by the housing, and a first power tool battery pack port supported by the housing. The first power tool battery pack port is configured to receive a first power tool battery pack. The portable power source also includes a second power tool battery pack port supported by the housing, and a charging circuit coupled to the battery, the first power tool battery pack port, and the second power tool battery pack port. The second power tool battery pack port is configured to receive a second power tool battery pack. The charging circuit is configured to selectively receive power from the battery and the first power tool battery pack port, and provide power to the second power tool battery pack port to charge the second power tool battery pack.

Other aspects of the invention will become apparent by consideration of the detailed description and accompanying drawings.

BRIEF DESCRIPTION OF THE DRAWINGS

FIGS. 24A-24B illustrate power device according to a tenth embodiment of the invention.

DETAILED DESCRIPTION

Figure 1:
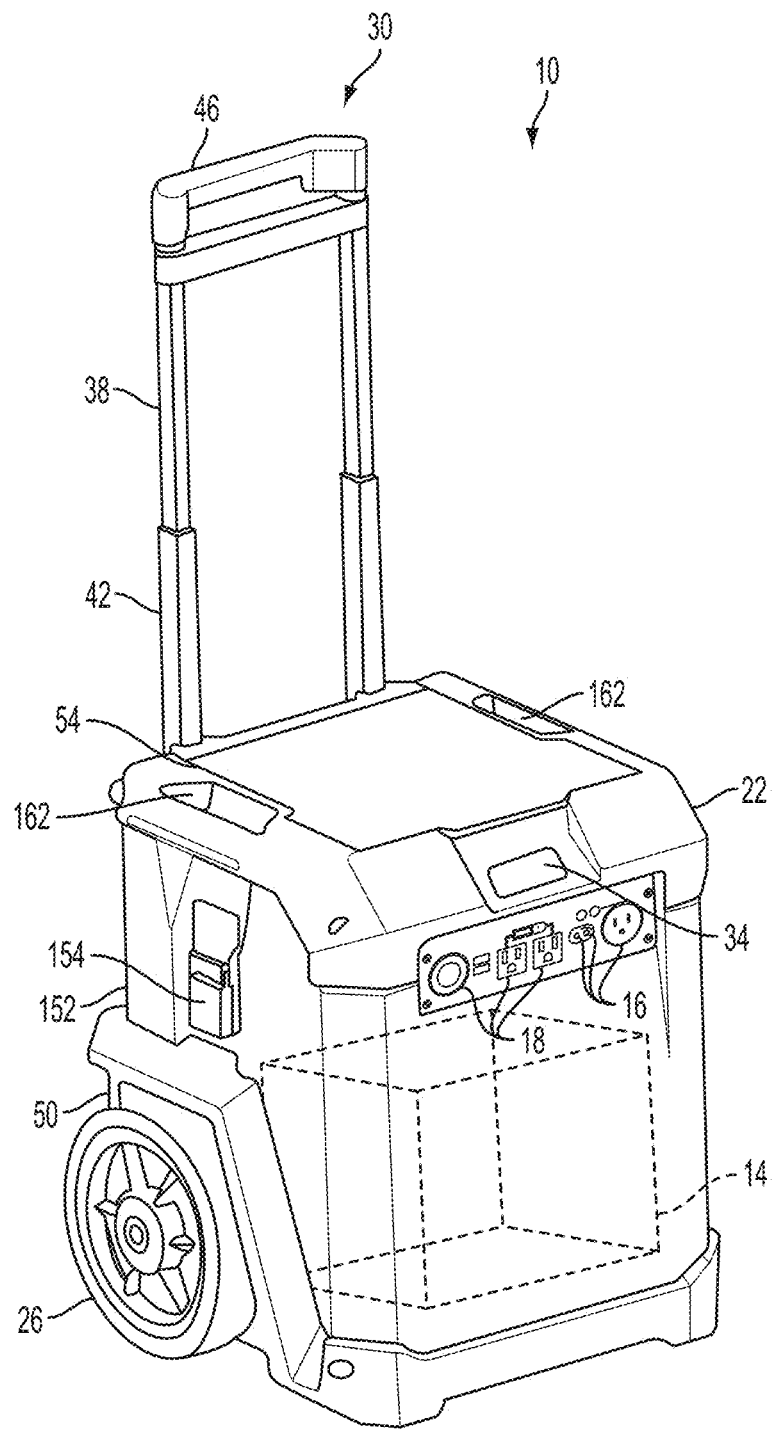
FIG. 1 is a top, front perspective view of a power supply device according to a first embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. Furthermore, and as described in subsequent paragraphs, the specific mechanical configurations illustrated in the drawings are intended to exemplify embodiments of the invention and that other alternative mechanical configurations are possible. For example, "controllers" described in the specification can include standard processing components, such as one or more processors, one or more computer-readable medium modules, one or more input/output interfaces, and various connections (e.g., a system bus) connecting the components.

FIG. 1 shows a battery charger and power supply device 10. The battery charger and power supply device 10 (hereinafter referred to simply as a "power device") includes a battery 14. The power device 10 is configured to distribute the power from the battery 14 to provide power to a peripheral device. The peripheral device may be a smartphone, a tablet computer, a laptop computer, a portable music player, a power tool, a power tool battery pack, and the like. The peripheral device may be configured to receive DC and/or AC power from the power device 10. The power device 10 is also configured to receive power from an external power source and use the power from the power source to power the peripheral device. The external power source may be a DC power source, for example, a photovoltaic cell (e.g., a solar panel), or the power source may be an AC power source, for example, a conventional wall outlet. Additionally, the power device 10 is configured to receive power from the external power source to charge the battery 14. The power device 10 also includes an inverter to invert DC power from the battery 14 to AC power for powering AC-powered peripheral devices.

Figure 8:
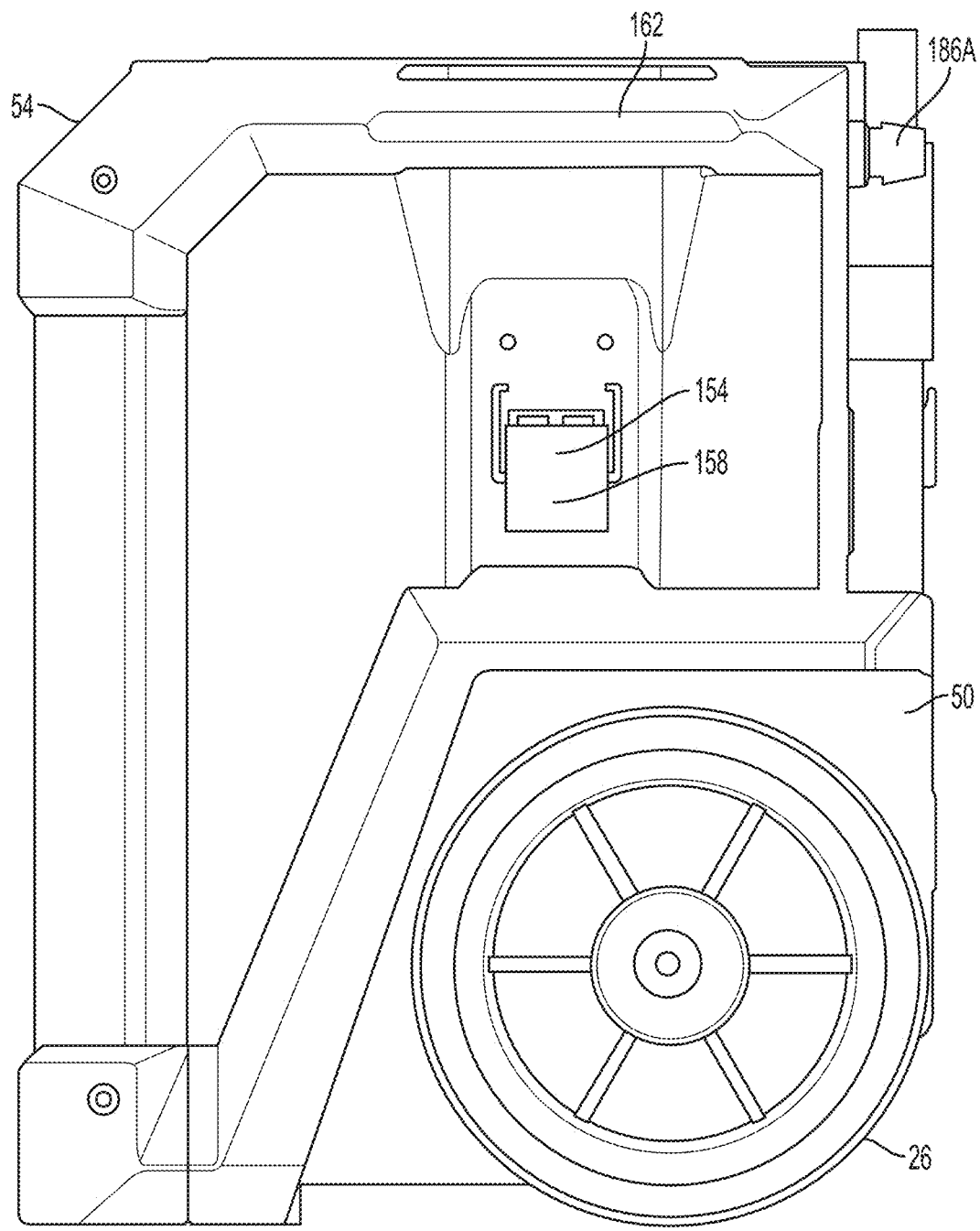
FIG. 8 is a side view of the power supply device of FIG. 1.
Figure 9:
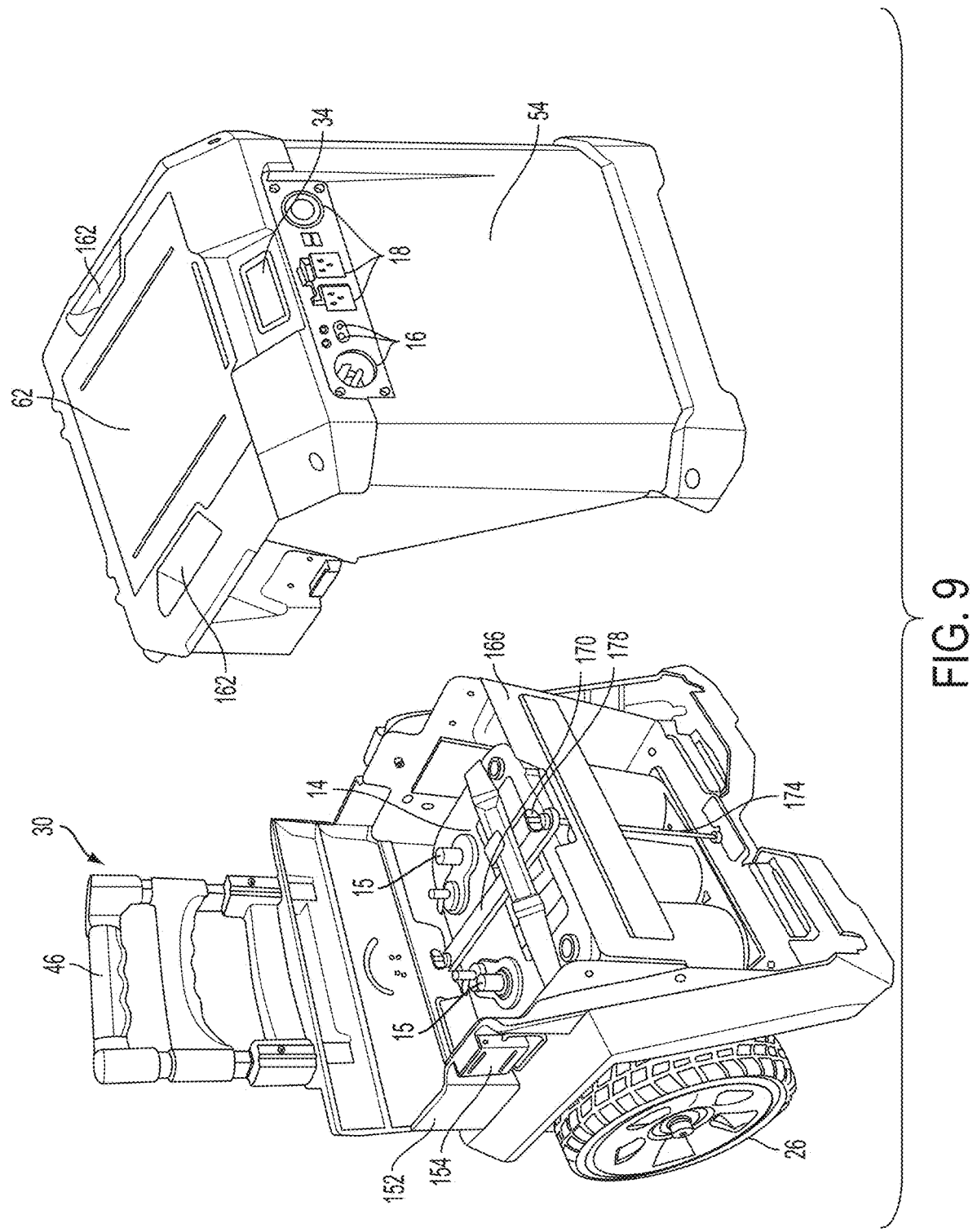
FIG. 9 is a top perspective view of the power supply device of FIG. 1 with a top portion of a housing removed from the power supply device of FIG. 1.
Figure 10:
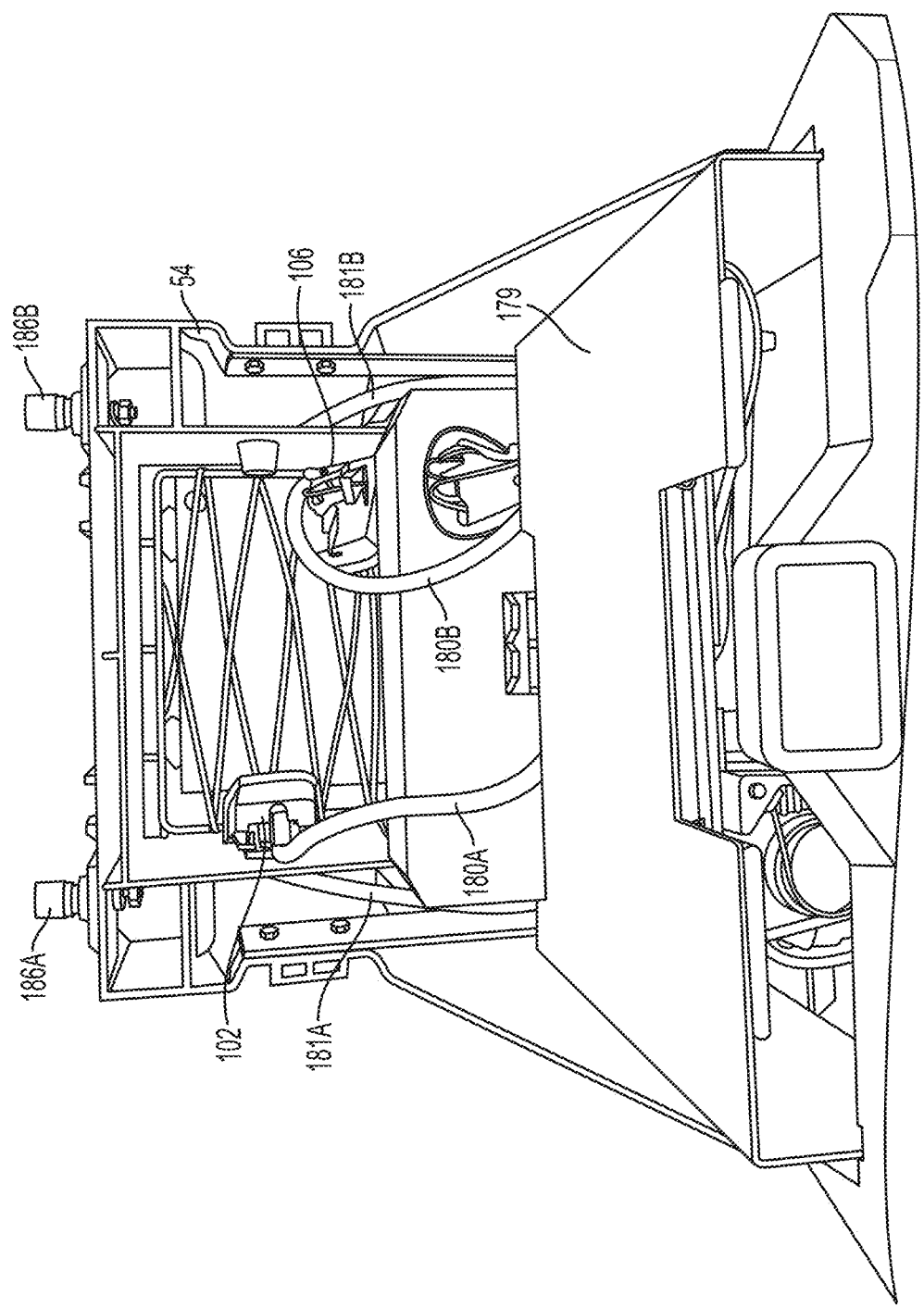
FIG. 10 is back view of the power supply device of FIG. 1.

The power device 10 includes a battery receptacle 12 to receive the battery 14 (see FIG. 9), a power supply unit 16, a power output panel 18, a housing 22, two wheels 26 (only one of which is shown in FIG. 1), a handle 30, and a display 34. In the illustrated embodiment, the battery 14 is a 12 volt battery typically referred to a "vehicle battery." The battery 14 may be a lead acid battery or a battery of another chemistry and/or another voltage. The battery 14 includes one or more cells within a housing, and the housing includes two exposed terminals 15 (e.g., a positive terminal and a negative terminal) on a top surface thereof (FIG. 8). Similarly, the handle 30 is a telescoping handle movable between an extended position (FIG. 1) and a collapsed position (FIG. 10). The handle 30 includes an inner tube 38 and an outer tube 42. The inner tube 38 fits inside the outer tube 42 and is slidable relative to the outer tube 42. The inner tube 38 is coupled to a horizontal holding member 46. The handle 30 also includes a locking mechanism to prevent the inner tube 38 from moving relative to the outer tube 42 by accident. The locking mechanism may include notches, sliding catch pins, or another suitable locking mechanism to inhibit the inner tube 38 from sliding relative to the outer tube 42 when the handle 30 is in the extended position (FIG. 1) and/or in the collapsed position (FIG. 10). In practice, a user holds the holding member 46 and pulls upward to extend the handle 30. The inner tube 38 slides relative to the outer tube 42 until the handle 30 locks in the extended position. The user may then pull and direct the power device 10 by the handle 30 to a desired location. The wheels 26 of the power device 10 facilitate such movement.

Figure 2:
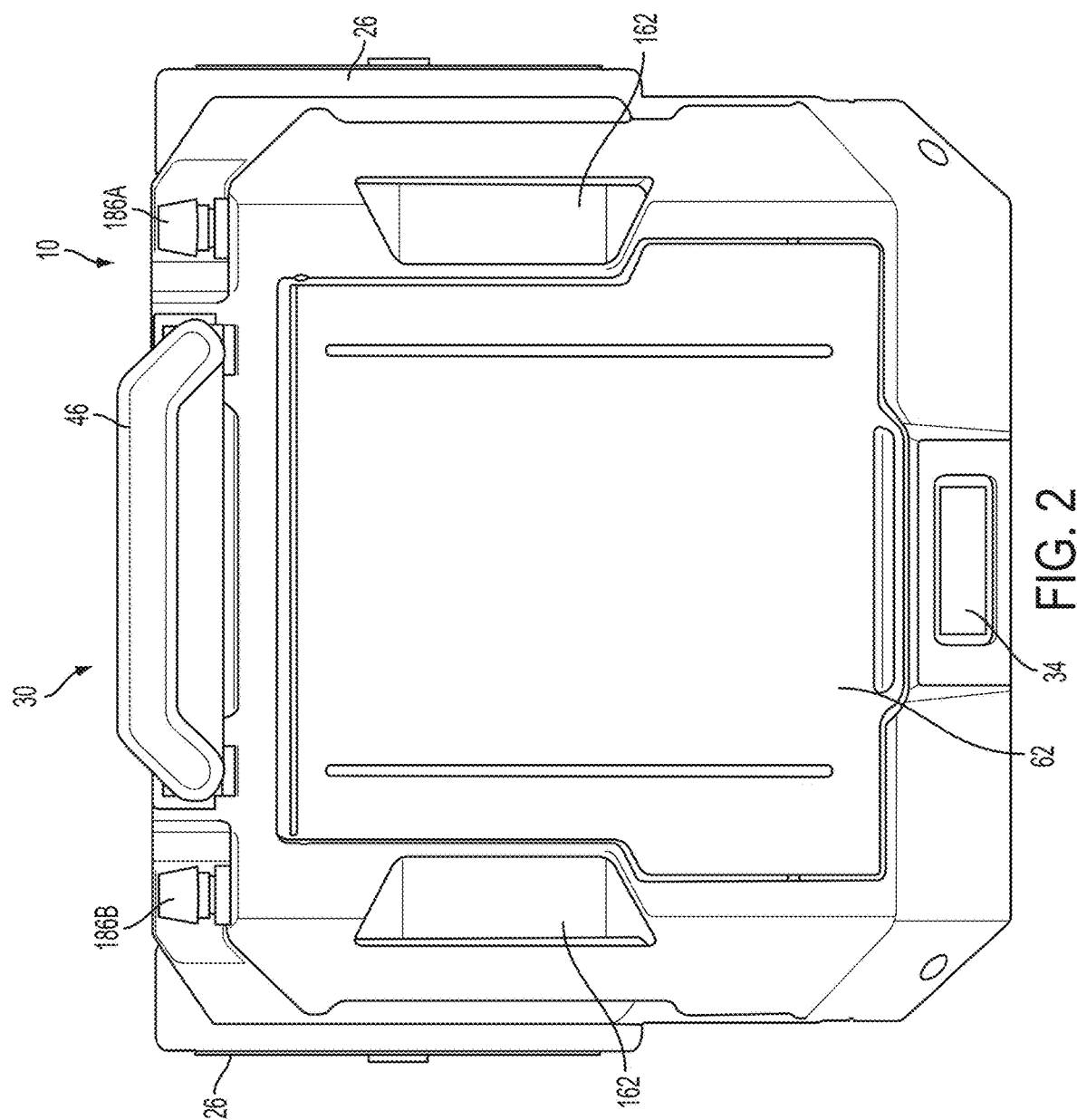
FIG. 2 is a top view of the power supply device of FIG. 1 with a lid in a closed position.
Figure 3:
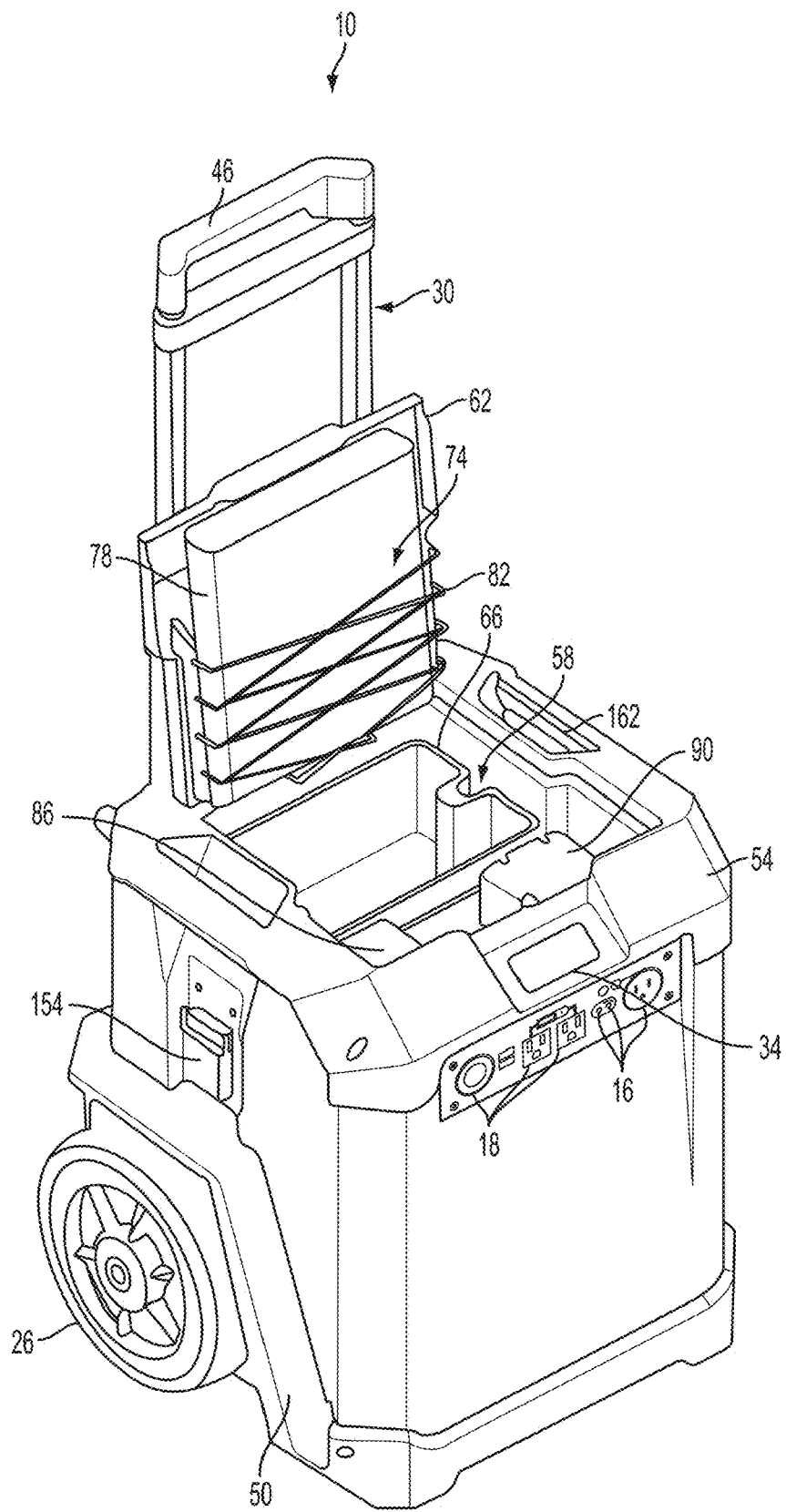
FIG. 3 is a perspective view of the power supply device of FIG. 1 with the lid in an open position.

The housing 22 includes a base portion 50 and a top portion 54. The base portion 50 generally supports the components of the power device 10 and includes the wheels 26. The wheels 26 facilitate movement of the power device 10 along a surface thereby making the power device 10 portable and convenient. The top portion 54 includes a storage compartment 58 (FIG. 3), the power supply unit 16, the power output panel 18, and a lid 62 (FIG. 2). As shown in FIG. 2, the lid 62 selectively covers and provides access to the storage compartment 58. The lid 62 is coupled to the top portion 54 of the power device 10 by a hinge. The lid 62 is pivotable between a closed position (FIG. 2) and an open position (FIG. 3). As shown partly in FIG. 3, the storage compartment 58 includes a removable storage bin 66, a first battery pack charging port 70 (FIG. 5), a second battery pack charging port 72 (FIG. 5), a first battery pack charging indicator 73A, a second battery pack charging indicator 73B, an elastic storage compartment 74, and a photovoltaic cell 78 (e.g., a solar charging array 78). The lid 62 provides selective access to the removable storage bin 66, the first and second battery pack charging ports 70, 72, the battery pack charging indicators 73A, 73B, the elastic storage compartment 74, and the photovoltaic cell 78. The elastic storage compartment 74 is coupled directly to the lid 62 and includes an elastic band 82. In the illustrated embodiment, the solar charging array 78 is stored in the elastic storage compartment 74. The solar charging array 78 may be removed from the elastic storage compartment 74 and placed on the outside of the power device 10 to receive sunlight. The solar charging array 78 may then be connected to the power device 10 via a cable (not shown) to provide DC power to the power device 10.

The first battery pack port 70 is associated with the first battery pack charging indicator 73A and is configured to receive a first battery pack 86. In the illustrated embodiment, the first battery pack 86 is a tower style battery pack. Accordingly, the first battery pack port 70 includes an insertion hole 71 to receive tower style battery packs. The first battery pack charging indicator 73A signals a charge status of the first battery pack 86, such as charging, fully charged, or fault present. For example, the first battery pack charging indicator 73A includes two LEDs. In one embodiment, the LEDs may be of different colors, for example green and red. The first battery pack charging indicator 73A may then show that the first battery pack 86 is charging by, for example, flashing a red LED. Alternatively, the first battery pack charging indicator 73A may show that the first battery pack 86 is completely charged by, for example, lighting a green LED.

The second battery pack port 72 is associated with the second battery pack charging indicator 73B and is configured to receive a second battery pack 90. In the illustrated embodiment, the second battery pack 90 is a slide-on style battery pack. Accordingly, the second battery pack port 72 includes guide rails 75 to receive slide-on style battery packs. The second battery pack charging indicator 73B signals a charge status of the second battery pack 90, such as charging, fully charged, or fault present. For example, the second battery pack charging indicator 73B includes two LEDs. In one embodiment, the LEDs may be of different colors, for example green and red. The second battery pack charging indicator 73B may then show that the second battery pack 90 is charging by, for example, flashing a red LED. Alternatively, the second battery pack charging indicator 73B may show that the second battery pack 90 is completely charged by, for example, lighting a green LED.

The battery packs 86, 90 are power tool battery packs generally used to power a power tool, such as an electric drill, an electric saw, and the like. In some embodiments, each battery pack 86, 90 includes a microcontroller that monitors characteristics of the battery pack 86, 90. For example, the microcontroller may monitor the state of charge of the battery pack 86, 90, the temperature of the battery pack 86, 90, or other characteristics relevant to the battery pack 86, 90. The microcontroller may also control aspects of charging and/or discharging of the battery pack 86, 90. In the illustrated embodiment, the first battery pack 86 is different than the second battery pack 90. In other embodiments, the first battery pack 86 may be the same as the second battery pack 90. In such embodiments, the first battery port 70 and the second battery port 72 are also the same. In the illustrated embodiment, at least one of the battery packs 90 also includes an indicator 94 on the face of the battery pack 90 to display the current state of charge of the battery pack 90 and/or other characteristics of the battery pack 90. In the illustrated embodiment, the indicator 94 includes a plurality of LEDs. As the state of charge of the battery pack 90 increases, more LEDs light up and as the state of charge of the battery pack 90 decreases, less LEDs light up. The battery packs 86, 90 may include a different type of indicator to display the state of charge of the battery. For example, the indicator 94 may include a single LED that lights up only when the battery pack 86, 90 is fully charged. In other embodiments, the battery pack 86, 90 does not include an indicator.

In the illustrated embodiments, the battery packs 86, 90 include lithium ion cells. In other embodiments, the battery packs 86, 90 may be of a different chemistry, for example, nickel-cadmium, nickel-hydride, lithium ion, and the like. In the illustrated embodiment, the first battery pack 86 is a 12 volt battery and the second battery pack 90 is an 18 volt battery. In other embodiments, the output voltage level of the battery packs 86, 90 may be different. For example, the battery packs 86, 90 can be 4 volt battery packs, 28 volt battery packs, 40 volt battery packs, or another voltage. The battery pack 86, 90 may also have various capacities (e.g., 1.5, 2, 3, or 4 ampere-hours). For instance, in the illustrated embodiment, the first battery pack 86 may have a lower capacity (e.g., 2 ampere-hours) and the second battery pack 90 may have a higher capacity (e.g., 4 ampere-hours). In some embodiments, the battery packs 86,90 have a lower capacity than the battery 14, which may have a capacity of, for example, 20, 30, 40, 50, or 60 ampere-hours, or another capacity.

The battery packs 86, 90 also include terminals to connect to the power device 10. The terminals for the battery packs 86, 90 include a positive and a negative terminal to provide power to and from the battery pack 86, 90. In some embodiments, the battery packs 86, 90 also include a temperature terminal to monitor the temperature of the battery pack 86, 90 or of the power device 10. In some embodiments, the battery pack 86, 90 also includes data terminals to communicate with a portable device receiving power from the battery pack 86, 90 and with the power device 10. For example, the battery pack 86, 90 may include a microcontroller to monitor one or more characteristics of the battery pack 86, 90 and the data terminals may communicate with the power device 10 regarding the monitored characteristics.

The battery pack ports 70, 72 include terminals (FIG. 5) that connect to the terminals of the battery packs 86, 90. A latching mechanism on the battery pack 86, 90 (e.g., an insertion hole 71 and guide rails 75, respectively) and the battery pack ports 70, 72 is used to reliably and selectively secure the two components together. The battery pack ports 70, 72 include a positive and a negative terminal for receiving and providing power to the battery pack 86, 90. In some embodiments, the battery pack port 70, 72 also includes a temperature terminal for measuring the temperature of one of the battery pack 86, 90 and the battery pack port 70, 72. The battery pack port 70, 72 can also include data terminals for communicating with the battery pack 86, 90. In the illustrated embodiment, the storage compartment 58 also includes a circuit breaker box 98. The circuit breaker box 98 includes a circuit breaker and a reset button 99 in case the breaker trips and needs to be reset.

Figure 4:
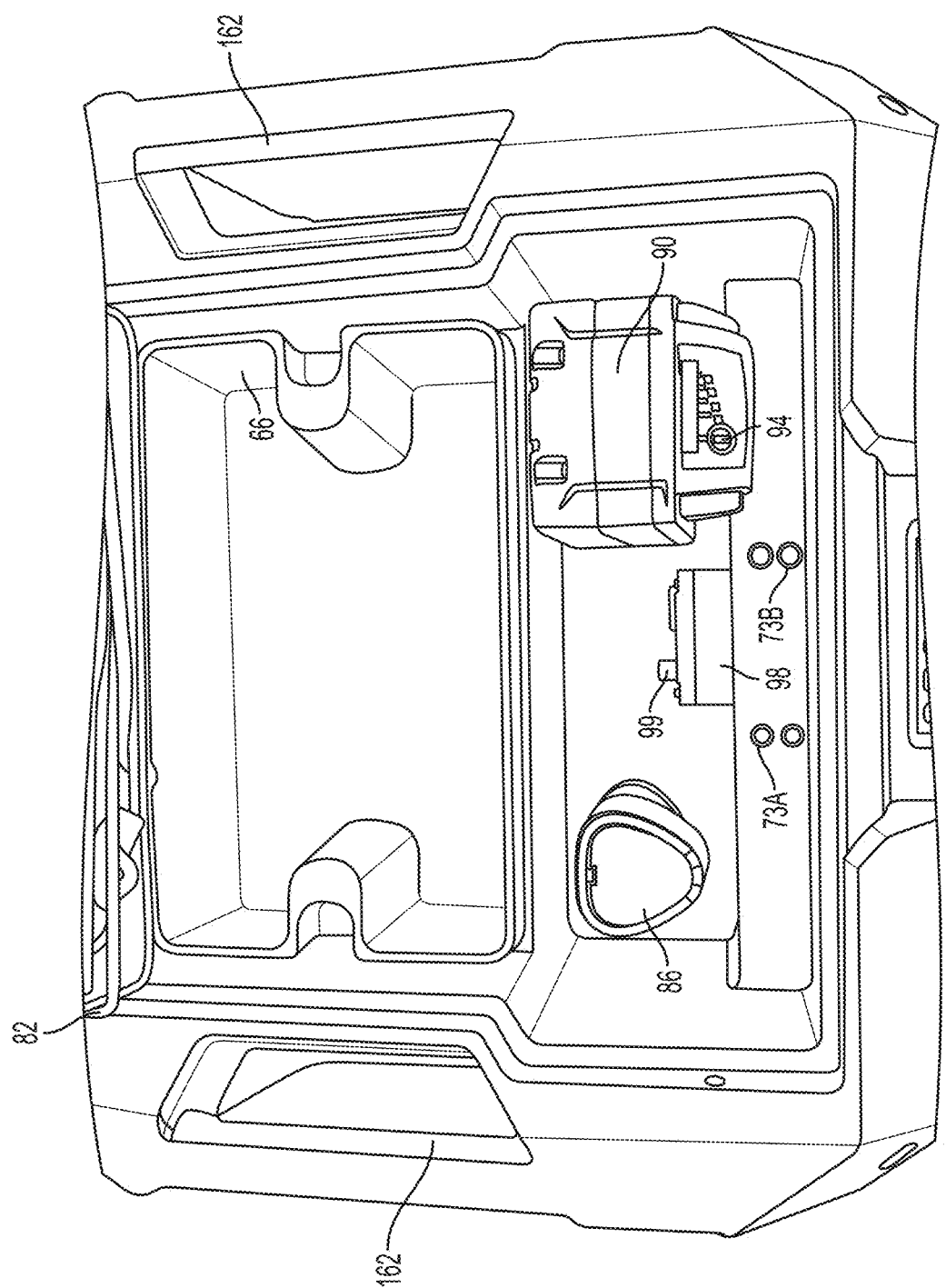
FIG. 4 is a top view of the power supply device of FIG. 1 with the lid in the open position.
Figure 5:
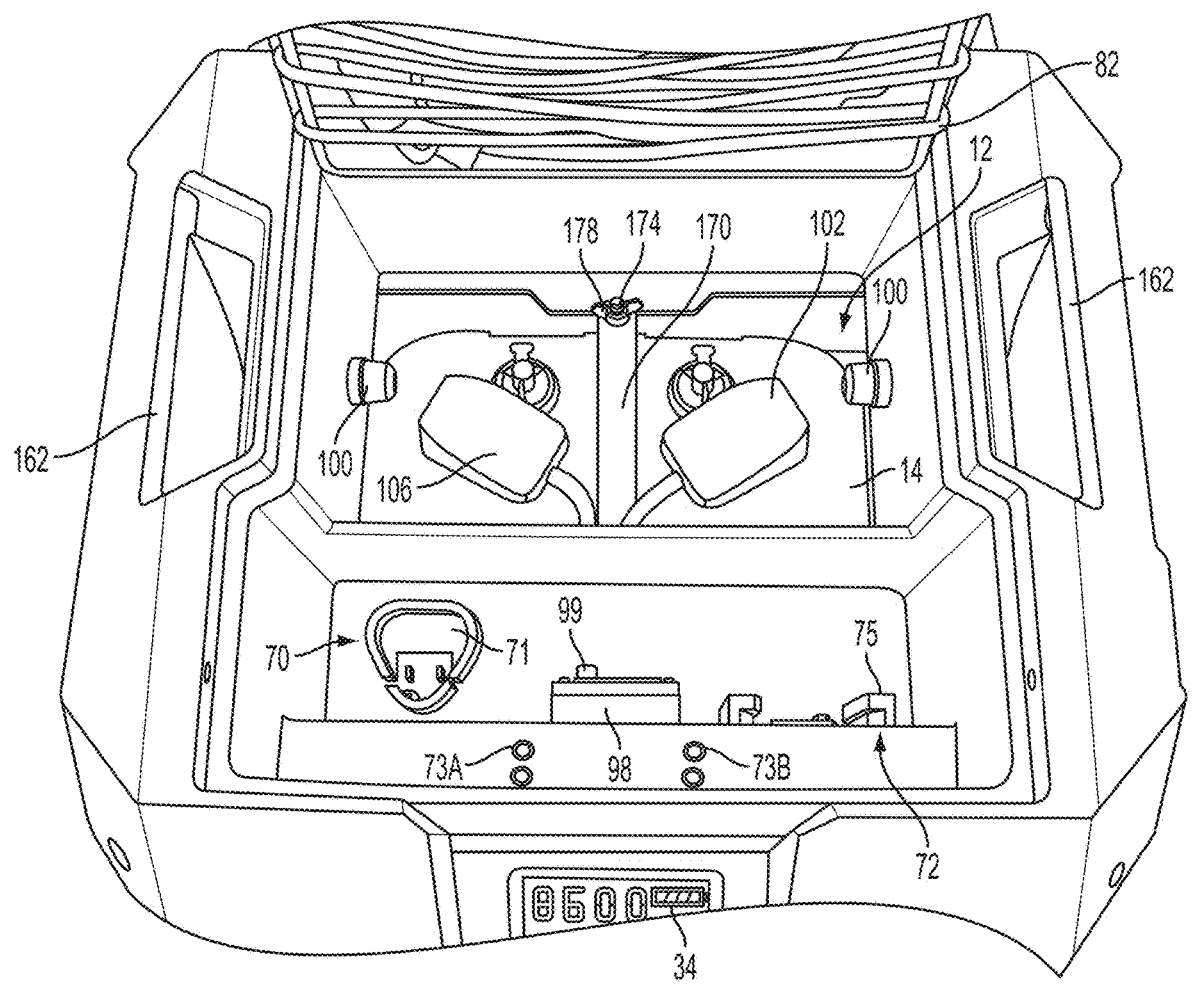
FIG. 5 is top view of the power supply device of FIG. 1 with a storage bin removed from the power supply device.

As shown in FIG. 4, the storage bin 66 is shaped to tightly fit in the storage compartment 58. The storage bin 66 may hold tools such as, for example, screwdrivers, wrenches, measuring tape, and the like. The storage bin 66 is removable from the storage compartment 58. As shown in FIG. 5, when the storage bin 66 is removed from the storage compartment 58, two pegs 100 and the battery receptacle 12 are exposed and become accessible. The two pegs 100 support the storage bin 66 when the storage bin 66 is positioned over the battery 14.

The battery receptacle 12 provides structural support and an electrical connection between the battery 14 and the other electrical components of the power device 10. The battery receptacle 12 is positioned in the base portion 50 of the housing 22, as shown in FIG. 9. The base portion 50 provides some structural support for the battery 14. The battery receptacle 12 includes quick-connect terminals 102, 106 to electrically connect the battery 14 to the power device 10, a front member 166, and a top member 170. The quick-connect terminals 102, 106 include a positive quick-connect terminal 102 and a negative quick-connect terminal 106 that are connected to other electrical components of the power device 10 via battery cables 180. In FIG. 5, the positive quick-connect terminal 102 and the negative quick-connect terminal 106 are shown connected to the battery 14.

Figure 6:
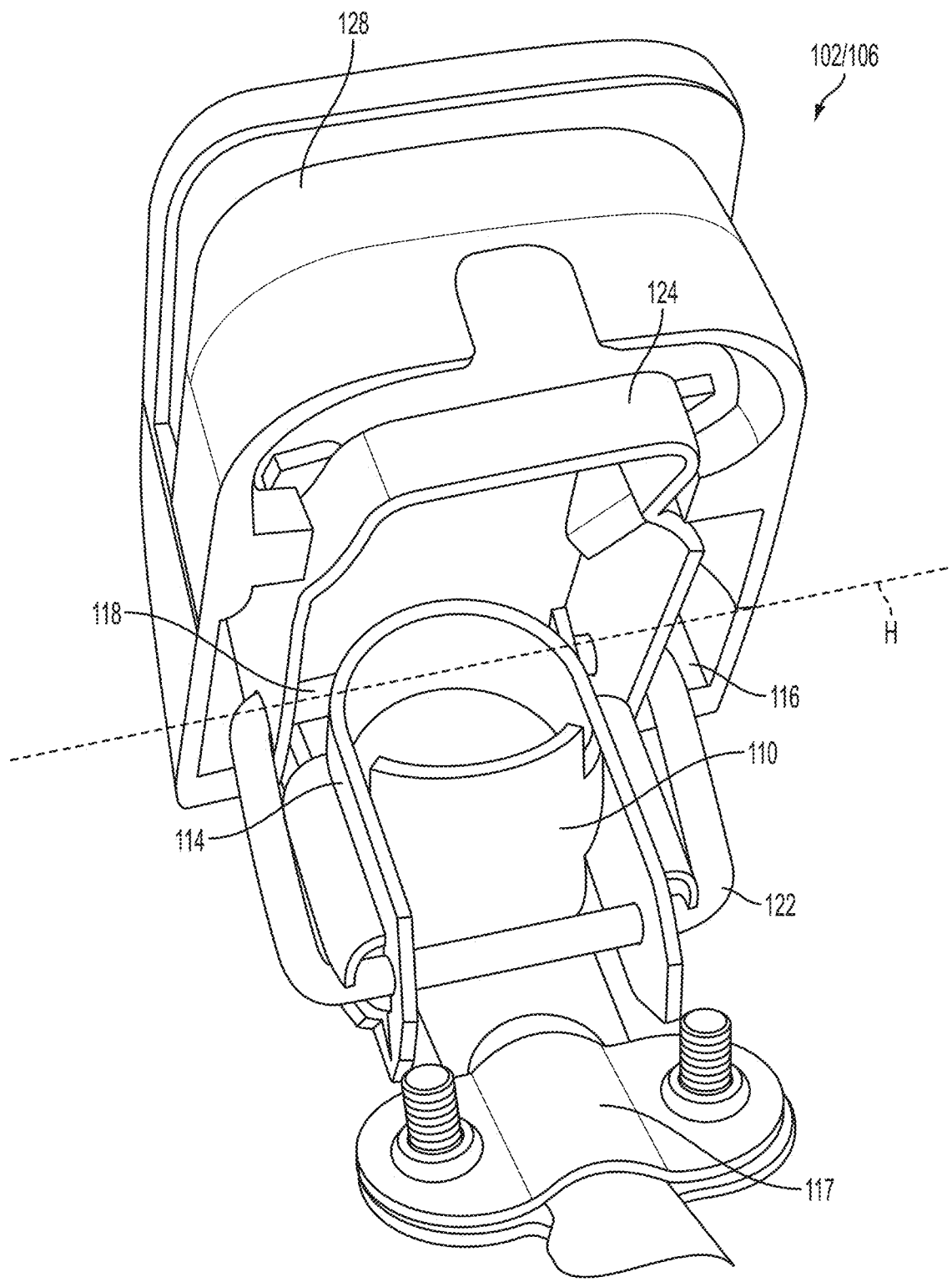
FIG. 6 is a top perspective view of a quick-connect terminal disconnected from a battery in an open position.
Figure 7:
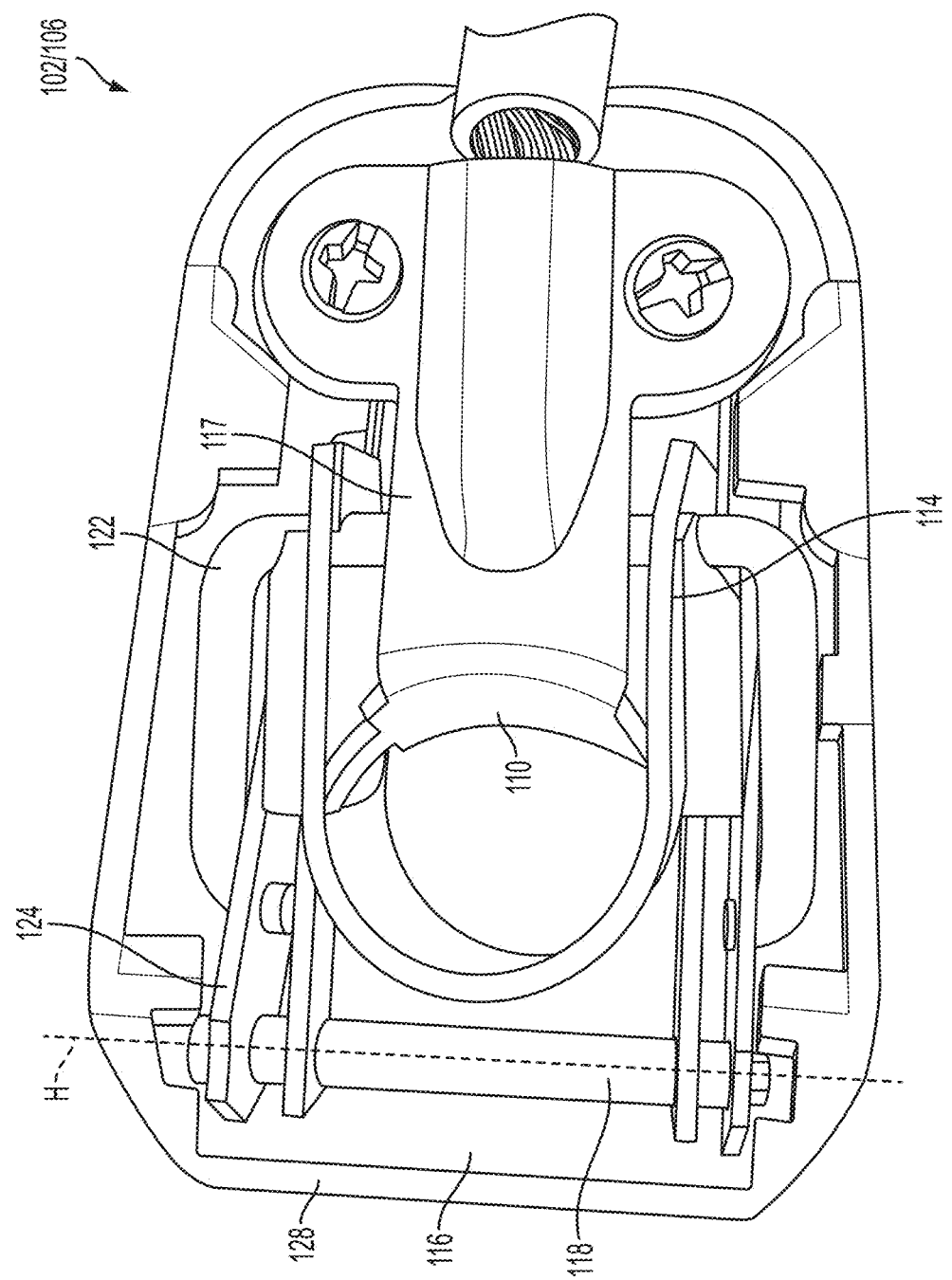
FIG. 7 is a bottom view of the quick-connect terminal disconnected from a battery in a closed position.

As illustrated in FIG. 6, the quick-connect terminals 102, 106 are pivot-clamping terminals and include a first conducting portion 110 and a second conducting portion 114. The first conducting portion 110 and the second conducting portion 114 are semi-circular and are configured to encircle the battery terminal. When the quick-connect terminal 102, 106 is in the open state (FIG. 6), the first conducting portion 110 and the second conducting portion 114 are spaced apart from each other and loosely fit around the battery terminal. When the quick-connect terminal 102, 106 moves to the closed state (FIG. 7), the first conducting portion 110 moves closer to the second conducting portion 114 in a clamping motion to lock the quick-connect terminal 102, 106 into secure contact with the battery terminal. The first conducting portion 110 is connected to a supporting rod 118 located on a distal end 116 of the quick-connect terminal 102, 106. The second conducting portion 114 is coupled to a second supporting rod 122 on a proximal end 117 of the quick-connect terminal 102, 106. The second supporting rod 122 is C-shaped. The first supporting rod 118 and the second supporting rod 122 are coupled to an actuating member 124. The actuating member 124 is coupled to the first supporting rod 118 and to the second supporting rod 122 at the distal end 116. The actuating member 124 is pivotable between an open position (FIG. 6) and a closed position (FIG. 7). The actuating member 124 pivots about a horizontal axis H. Because of the position of the junction between the actuating member 124 and the first supporting rod 118 and the position of the junction between the actuating member 124 and the second supporting rod 122, as the actuating member 124 pivots from the open position (FIG. 6) to the closed position (FIG. 7), the first supporting rod 118 is moved away from the center of the quick-connect terminal 102, 106, which causes the first conducting portion 110 to move toward the second conducting portion 114.

As shown in FIG. 6, in the open position, the actuating member 124 is generally upright (e.g., vertical), and the first supporting rod 118 is generally near the junction between the actuating member 124 and the second supporting rod 122 (e.g., the distance between the first supporting rod 118 and the second supporting rod 122 is minimized). In the open position, the distance between the first conducting portion 110 and the second conducting portion 114 is maximized. As shown in FIG. 7, in the closed position, the actuating member 124 is generally in a horizontal position, and the first supporting rod 118 is spaced apart from the junction between the actuating member 124 and the second supporting rod 122 (e.g., the distance between the first supporting rod 118 and the second supporting rod 122 is maximized). In the closed position, the distance between the first conducting portion 110 and the second conducting portion 114 is minimized. A plastic cap 128 is coupled to the actuating member 124 such that they move together as one unit. Thus, a user is able to change the position of the actuating member 124 by moving the plastic cap 128. In some embodiments, the cap 128 may be made of different insulating materials. When the connection between the quick-connect terminals 102, 106 and the battery 14 is not desired, a user may simply lift the plastic cap 128 and thereby break the connection to the battery 14.

As previously discussed, the battery receptacle 12 is formed in part by the base portion 50 of the housing 22. The top portion 54 of the housing 22 is removable from the base portion 50. The battery receptacle 12 formed by the base portion 50 includes two sidewalls 152 and a back wall 153 that receive the battery 14. As shown in FIG. 8, the sidewalls 152 include a locking mechanism 154. The locking mechanism 154 is toolless. In other words, the locking mechanism 154 does not require any tools to be locked or released. In the illustrated embodiment, the locking mechanism 154 includes two latches 158 (only one of which is shown). The latches 158 securely couple the top portion 54 to the base portion 50. In other embodiments, the locking mechanism 154 may include other suitable connecting members. The top portion 54 also includes handles 162. The handles 162 facilitate removal of the top portion 54 once the locking mechanism 154 has been released. In the illustrated embodiment, the handles 162 are positioned next to the lid 62 of the storage compartment 58.

As shown in FIG. 9, when the top portion 54 is removed from the base portion 50, the battery receptacle 12 is again exposed and access is provided to the vehicle battery 14. The battery receptacle 12 includes the front member 166 and the top member 170 to hold the battery 14 in place within the power device 10. The front member 166 inhibits the battery 14 from moving forward, while the top member 170 inhibits the battery 14 from moving toward the top of the power device 10, for instance, if the power device 10 is positioned upside down. The top member 170 is held in place via two partially threaded rods. The top member 170 includes two holes (not shown) aligned with the back of the battery 14 and the front of the battery 14, respectively. Each of the holes receives a partially threaded rod 174. The partially threaded rod 174 receives a wing nut 178. When the wing nut 178 is tightened, the wing nut 178 holds the top member 170 in place relative to the battery 14 and to the partially threaded rods 174. The wing nut 178 includes flanges that allow a user to easily install and remove the top member 170 from the partially threaded rod 174. When the top portion 54 is removed, the battery 14 may then be exchanged for another battery 14 or simply removed from the power device 10, for example, for installation in a vehicle.

Thus, the vehicle battery 14 may be removed from the battery receptacle 12 without the need for any tools. For example, in practice, a user first disconnects the quick-connect terminals 102, 106 from the battery 14, and the user then releases the locking mechanism 154 coupling the top portion 54 to the base portion 50. The user then removes the top portion 54 from the base portion 50. The user unscrews the wing nut 178 to release the top member 170 from the partially threaded rods 174. Once the top member 170 is released, the battery 14 is removed from the top in the direction of arrow A.

As shown in FIG. 10, the back wall 153 of the base portion 50 includes a bottle opener 182 and a cord wrap 190. In the illustrated embodiment, the cord wrap 190 receives an extension cord used, for example, to connect the power device 10 to an AC wall outlet. Alternatively, the cord wrap 190 may receive jumper cables to connect the battery 14 to an input or an output device (e.g., to jump start a vehicle). In other embodiments, the back wall 153 may include other components such as, for example, a storage pocket, a speaker, and the like.

Figure 11:
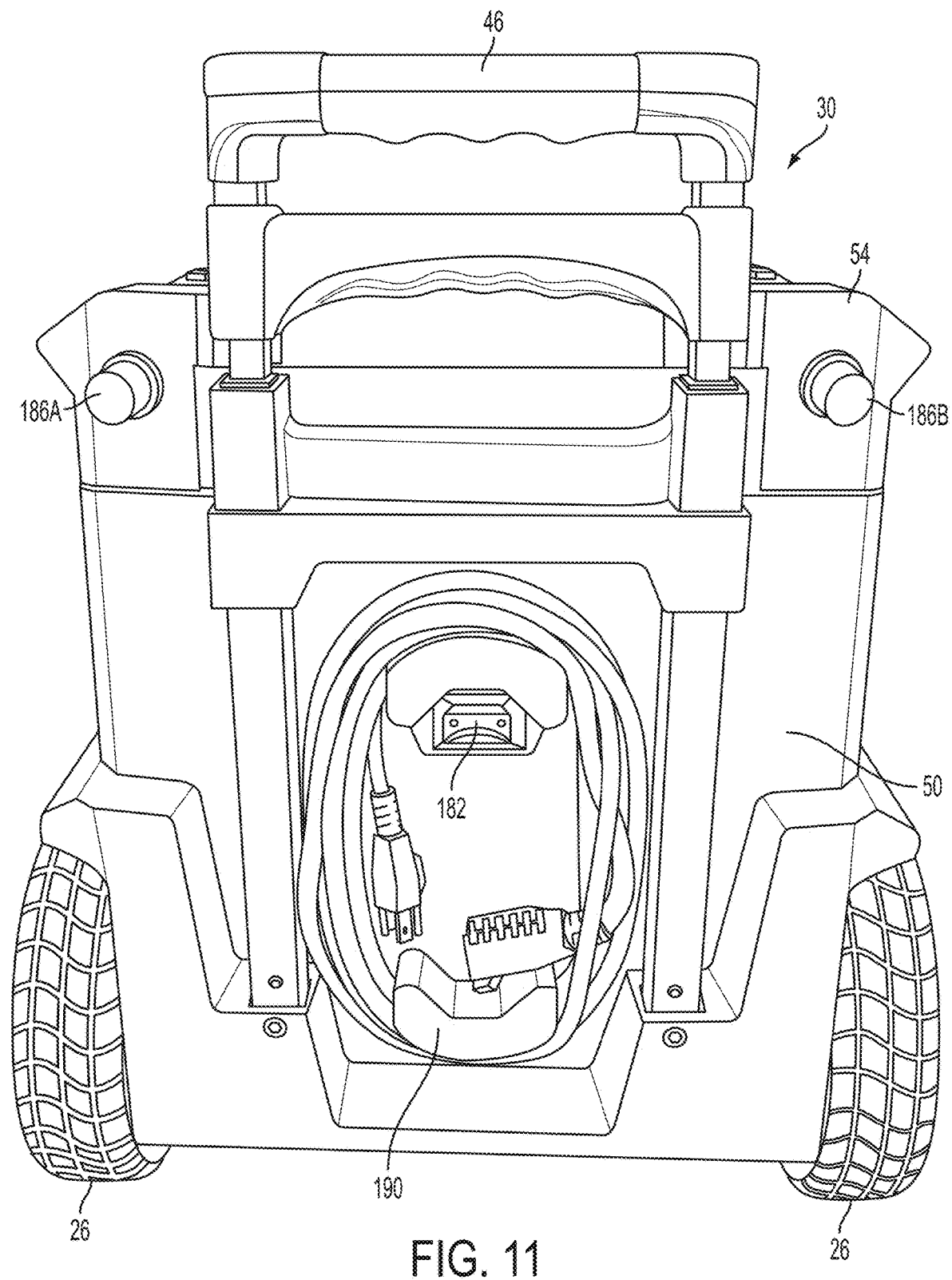
FIG. 11 is a bottom view of the top portion of the housing of FIG. 9.

As shown in FIG. 11, the top portion 54 supports the circuitry for the power device 10. In the illustrated embodiment, a metal plate 179 holds the circuitry components in place relative to the power device 10. FIG. 11 also illustrates lead wires (e.g., battery cables) 180 connecting the battery 14 to the power device 10 to enable use and/or charging of the battery 14. The positive quick-connect terminal 102 is connected to a positive lead wire 180A and the negative quick-connect terminal 106 is connected to a negative lead wire 180B. As also shown in FIG. 11, a backside of the top portion 54 includes secondary battery terminals 186. The secondary battery terminals 186 include a secondary positive battery terminal 186A and a secondary negative battery terminal 186B. The secondary battery terminals 186 are connected to the battery 14 via a second set of lead wires (e.g., cables) 181 and are configured to receive power from an external source (e.g., a vehicle battery charger) to charge the battery 14 and/or provide power from the battery 14 to an external device (e.g., an external vehicle battery) to charge the external device (e.g., the external vehicle battery). The secondary positive battery terminal 186A is connected to the positive lead wire 181A and the secondary negative battery terminal 186B is connected to the negative lead wire 181B. In some embodiments, the lead wires 180 coupled to the quick-connect terminals 102, 106 and the lead wires 181 coupled to the battery terminals 186 are electrically connected to the same electrical node such that the battery terminals 186 may thereby be directly coupled to the battery 14.

Figure 12:
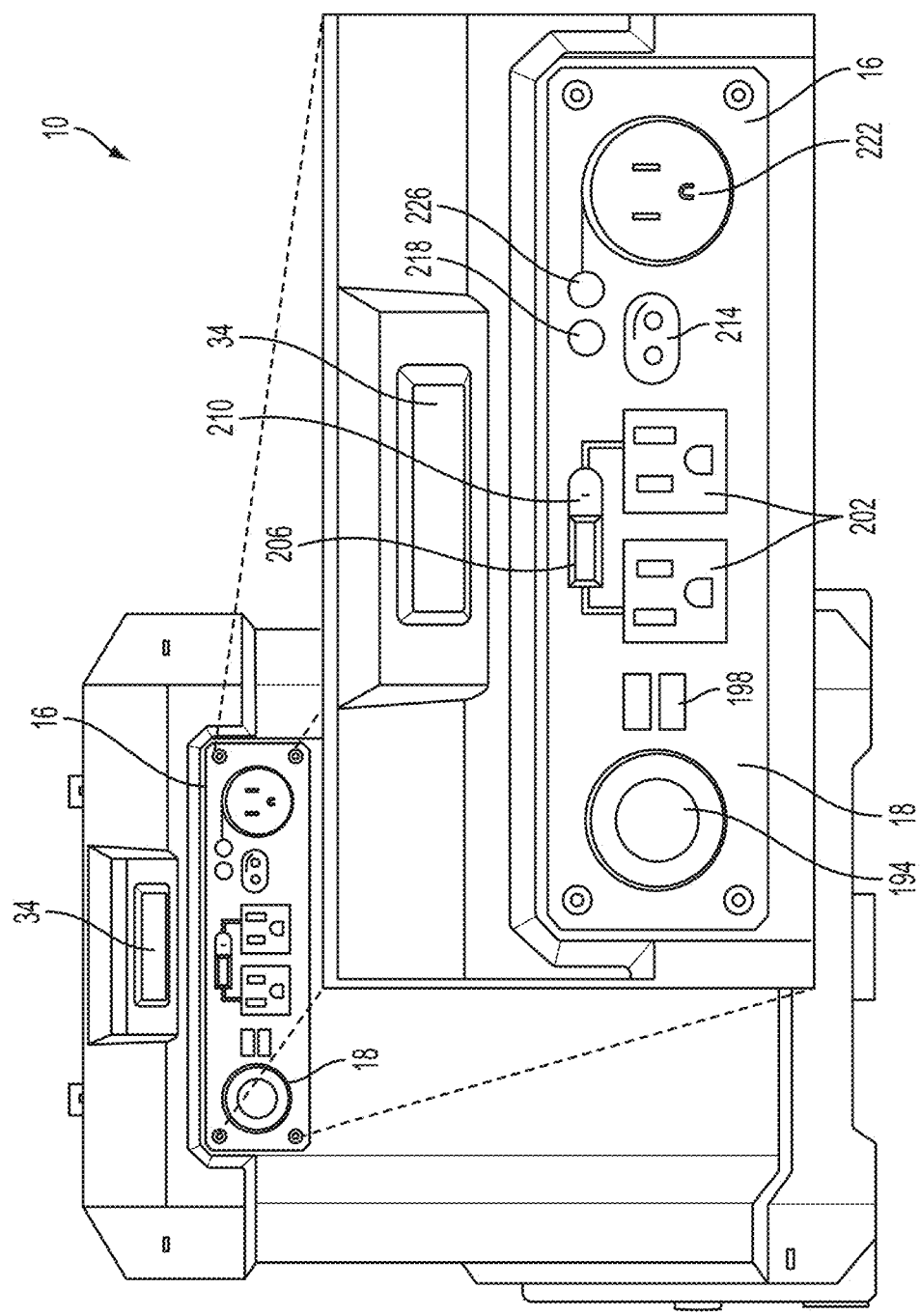
FIG. 12 is a front view of the power supply device of FIG. 1.
Figure 13:
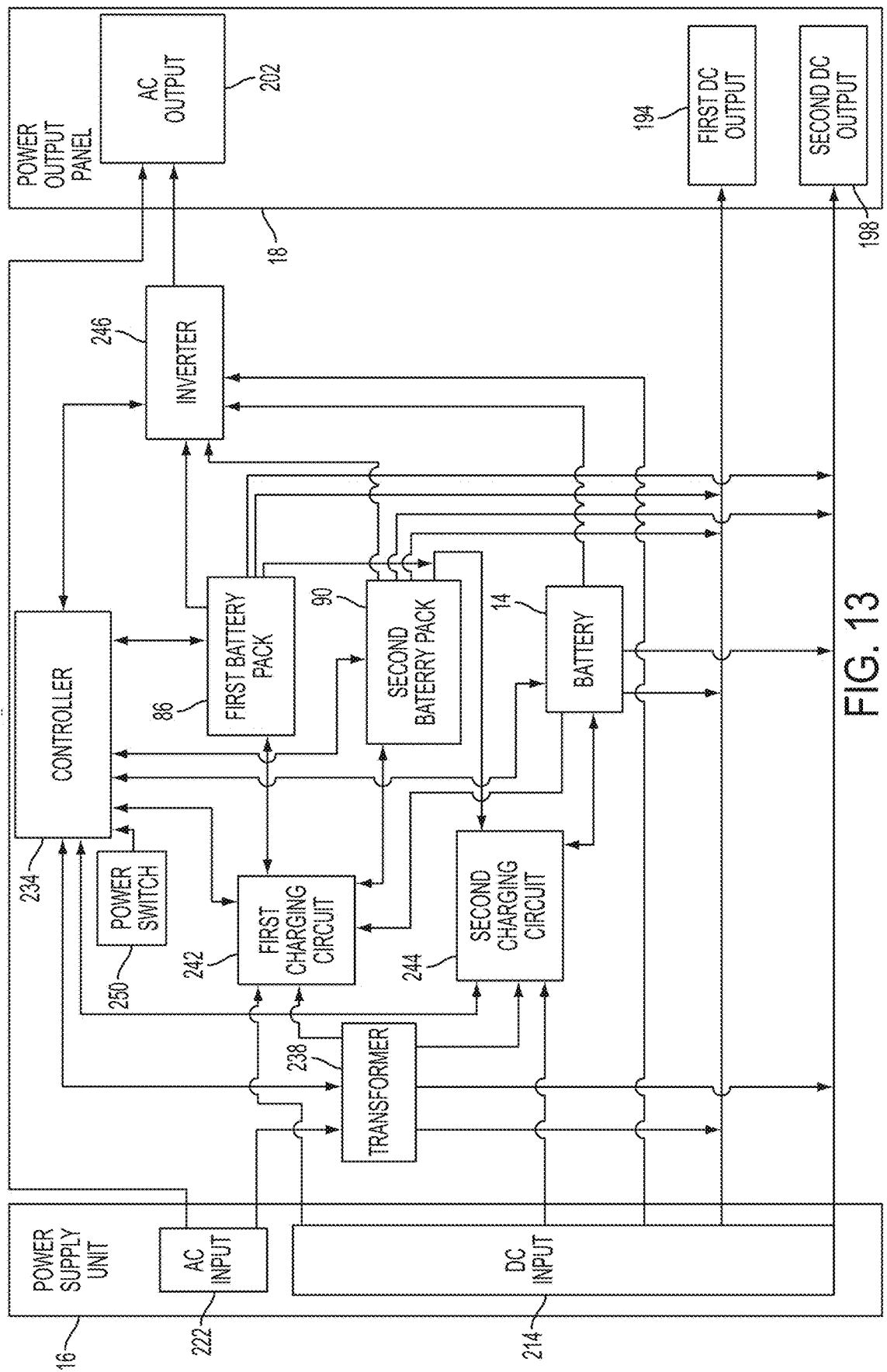
FIG. 13 is a schematic diagram of the power supply device of FIG. 1.

As shown in FIG. 13, the illustrated power device 10 includes the power supply unit 16, a controller 234, a transformer 238, a first charging circuit 242, a second charging circuit 244, an inverter 246, a power switch 250, and the power output panel 18. These electrical components, except for the battery 14, are supported by the top portion 54 and held in place by the metal plate 179. As shown in detail in FIG. 12, the power supply unit 16 includes a DC input 214, a DC input indicator 218, an AC input 222, and an AC input indicator 226. The power supply unit 16 receives power from the DC input 214 and/or the AC input 222, based on which external power source is available, for the power device 10 to distribute the received power. The AC input 222 receives a female end of an AC cord, the other end of which is selectively coupled to, for example, a conventional AC wall outlet to provide power to the power device 10. The DC input 214 connects to an external DC power source such as, for example, an external battery, a vehicle DC socket, a vehicle battery, a photovoltaic cell, and/or the solar charging array 78. The DC input indicator 218 is illuminated when the DC input 214 receives and provides power to the power device 10. The AC input indicator 226 is illuminated when the AC input 222 receives and provides power to the power device 10.

The power inputs from the power supply unit 16 provide power to the battery pack charging ports 70, 72, the battery 14, the secondary battery terminals 186, and/or the power output panel 18. In the illustrated embodiment, the power supply unit 16 is connected directly to the power output panel 18. For example, the AC power input 222 is directly connected to an AC output connector 202 to provide AC power, and the DC power input 214 is directly connected to a first DC output connector 194 and/or a second DC output connector 198. In some embodiments, the power supply unit 16 and the power output panel 18 may be coupled via a filtering, buffering, and/or conditioning stage. For example, the DC power input 214 may be coupled to the power output panel 18 through a DC-to-DC converter to provide the adequate voltage output. Although not shown, protection circuitry may be included to prevent AC power provided to AC output connector 202 from other sources (e.g., inverter 246) from causing terminals of the AC power input 222 to be conducting power (e.g., have "hot" input terminals).

The transformer 238 is electrically connected to the AC power input 222, the first DC power output connector 194, the second DC power output connector 198, the first charging circuit 242, the second charging circuit 244, and the controller 234. The transformer 238 receives AC power from the AC power input 222 and converts the AC power to DC power at one or more levels (e.g., 5V, 12V, and the like). The transformer 238 sends a control signal to the controller 234 to indicate that power is provided through the AC power input 222. The transformer 238 also provides the DC power to the first charging circuit 242 to charge the battery packs 86, 90. In other embodiments, the power device 10 includes a first charging circuit for the first battery pack 86 and a separate charging circuit for the second battery pack 90. The transformer 238 also provides the DC power to the second charging circuit 244 to charge the battery 14 if the state of charge of the battery 14 is below a predetermined voltage threshold. In some embodiments, the first charging circuit 242 and the second charging circuit 244 are combined into a single charging circuit (e.g., the first charging circuit 242) to control the charging of both the battery 14 and the battery packs 86, 90. The transformer 238 also provides the DC power to the first DC output connector 194 and to the second DC output connector 198 to provide power to a peripheral device. The DC output by the transformer 238 may be at different voltage levels for different components. For example, the transformer 238 may provide 18 volts for the first charging circuit 242 and 5 volts for the second DC output 198.

The DC power input 214 is connected to the first DC power output connector 194, the second DC power output connector 198, the inverter 246, the first charging circuit 242, the second charging circuit 244, and the controller 234. When an external DC power source is present and connected, the DC power input 214 sends a control signal to the controller 234 to indicate that power is provided through the DC power input 214. The DC power input 214 transfers the DC power to the first charging circuit 242 to charge the battery packs 86, 90 and to the second charging circuit 244 to charge the battery 14. The DC power input 214 also transfers DC power to the first DC power output connector 194 and to the second DC power output connector 198 to provide power for a peripheral device. The DC power input 214 is also electrically connected to the inverter 246. Although not shown, one or more DC-to-DC converters may be provided to receive and step down or up the DC input voltage to a level appropriate for the various components receiving the DC input voltage. For instance, the DC input 214 may receive 12 volts DC, which is converted to 18 volts for the charging circuit 242 and converted to 5 volts for the second DC output 198.

The inverter 246 is connected to the DC power input 214, the battery 14, the battery packs 86, 90, the AC power output connector 202, and the controller 234. The inverter 246 includes a DC input (e.g., from the DC power input 214, the battery 14, and/or the battery packs 86, 90), inverter circuitry that inverts the DC power from the DC source to AC power, and an AC output coupled to the AC power output connector 202 to provide the AC power. The inverter circuitry includes, for instance, power switching elements selectively enabled by the controller 234 to transform DC power to AC power. The inverter 246 transfers the AC power to the AC power output connector 202 to provide power to an AC-powered peripheral device. The inverter 246 is also connected to the controller 234 to receive instructions from the controller. In the illustrated embodiment, the controller 234 is connected to a power switch 250 for the inverter 246. In such embodiments, the power switch 250 is the AC switch 206. In some embodiments, the power switch 250 determines whether the inverter 246 is enabled or disabled. In such embodiments, the controller 234 determines the position of the power switch 250 (on or off) and instructs the inverter 246 to turn on or off accordingly. In other embodiments, the power switch 250 is directly connected to the inverter 246 such that when the power switch 250 is open, the inverter 246 does not function (i.e., is disabled) and when the power switch 250 is closed, the inverter 246 functions (i.e., is enabled). In some embodiments, disabling the inverter 246 when the AC output connector 202 is not in use helps save energy. In yet other embodiments, the power switch 250 controls the operation of other aspects of the power device 10, as discussed above. In such embodiments, the power switch 250 and the AC switch 206 are two different switches.

The first charging circuit 242 is electrically connected to the controller 234, the transformer 238, the DC power input 214, the battery 14, the first battery pack 86, and the second battery pack 90. The first charging circuit 242 controls the charging scheme for the battery packs 86, 90. In some embodiments, the first charging circuit 242 varies a charging current based on the temperature of the battery pack 86, 90, the state of charge of the battery pack 86, 90, the amount of time the battery pack 86, 90 has been charging, requests from the battery pack 86,90, and other factors. The first charging circuit 242 receives DC power from one of the transformer 238, the DC power input 214, the battery packs 86, 90, and/or the battery 14. In other words, the battery packs 86, 90 can receive DC power from the transformer 238, the DC power input 214, the battery 14, and/or one of the battery packs 86, 90. The first charging circuit 242 then controls the charging current provided to the battery packs 86, 90. Since the battery packs 86, 90 can also provide DC power to the first charging circuit 242, the battery packs 86, 90 can charge each other. In particular, if the state of charge of the battery 14 is below a predetermined voltage threshold, and the state of charge of the first battery pack 86 connected to the first charging port 70 is low, and the state of charge of the second battery pack 90 is high enough to support charging of the first battery pack 86, the first charging circuit 242 may utilize DC power from the second battery pack 90 to charge the first battery pack 86. In some embodiments, the first charging circuit 242 may also utilize DC power from the first battery pack 86 to charge the second battery pack 90. In other embodiments, only the second battery pack 90 can provide DC power to charge the first battery pack 86. The first charging circuit 242 sends and receives information regarding the charging scheme for the battery packs 86, 90 to and from the controller 234. For example, the first charging circuit 242 may communicate to the controller 234 information about the present charging current used to charge the battery pack 86, 90 and/or the present temperature of the battery pack 86, 90. In some embodiments, the battery packs 86, 90 include the charging circuit needed to charge the battery packs 86, 90. In such embodiments, the battery packs 86, 90 may be connected to the controller 234 and directly with a DC power source such as, for example, the transformer 238, the DC power input 214, and/or the battery 14.

The second charging circuit 244 is electrically connected to the controller 234, the transformer 238, the DC power input 214, the first battery pack 86, the second battery pack 90, and the battery 14. The second charging circuit 244 controls the charging scheme for the battery 14. In some embodiments, the second charging circuit 244 varies a charging current based on the temperature of the battery 14, the state of charge of the battery 14, the amount of time the battery 14 has been charging, requests from the battery 14, and other factors. The second charging circuit 244 receives DC power from one of the transformer 238, the DC power input 214, the first battery pack 86, and the second battery pack 90. The second charging circuit 244 may send and receive information regarding the charging scheme for the battery 14 to and from the controller 234. For example, the second charging circuit 244 may communicate to the controller 234 the current state-of-charge of the battery 14. In some embodiments, the battery 14 does not require any particular charging schemes and the second charging circuit 244 is thus not necessary. In such embodiments, the battery 14 is directly connected to a DC power source, such as for example, the transformer 238, the DC power input 214, and/or the battery packs 86, 90. The battery 14 also receives charging power through the secondary battery terminals 186. In the illustrated embodiment, the secondary battery terminals 186 are connected directly to the battery 14. In other embodiments, when the secondary battery terminals 186 are connected to a power source (e.g., a vehicle battery charger), the secondary battery terminals 186 may connect to the second charging circuit 244 to charge the battery 14. In some embodiments, the battery 14 only receives charging power through the secondary battery terminals 186 on the top portion 54 of the power device 10. In other embodiments, the first charging circuit 242 and the second charging circuit 244 are combined such that the first charging circuit 242 also controls the charging of the battery 14.

The controller 234 is electrically connected to the transformer 238, the DC power input 214, the inverter 246, the power switch 250, the first charging circuit 242, and the second charging circuit 244, and the battery packs 86, 90 through the charging ports 70, 72. The controller 234 receives indication signals from the transformer 238 and from the DC power input 214 indicating that power is received through one of the transformer 238 and the DC power input 214. In some instances, the controller 234 is also operable to control the transformer 238 and/or the DC input 214 to control power conversion and/or power output levels. The controller 234 also receives and sends control signals to the inverter 246. In the illustrated embodiment, the controller 234 is connected to a power switch 250. The power switch 250, in some embodiments, controls the inverter 246. In such embodiments, the power switch 250 is equivalent to the AC switch 206. Also in such embodiments, the controller 234 sends control signals to the inverter 246 depending on the position of the power switch 250. In other embodiments, the power switch 250 controls the first charging circuit 242, the second charging circuit 244, or both. In such embodiments, the controller 234 sends control signals to the first charging circuit 242 and/or the second charging circuit 244 to start or stop charging the battery packs 86, 90 and/or the battery 14. The controller 234 includes a processor and memory storing software executed by the processor to effect the functionality of the controller 234 described herein. If multiple power inputs are connected and operable to provide power to the power device 10, the controller 234 is operable to select one for supplying power according to a predetermined priority schedule. Alternatively, additional circuitry may be provided so that the power device 10 can use multiple power sources simultaneously.

The power output panel 18 includes a first DC output connector 194, a second DC output connector 198, an AC output connector 202, an AC output switch 206, and an AC indicator 210. The first DC power output connector 194 and the second DC power output connector 198 receive DC power from the transformer 238, the DC power input 214, the battery 14, and the battery packs 86, 90, based on which power input is available to provide DC power. The first DC power output connector 194 and the second DC power output connector 198 are configured to receive and output DC power from the battery 14, for example, when the transformer 238 and the DC power input 214 are not receiving power from an external power source. In the illustrated embodiment, the first DC power output connector 194 and the second DC power output connector 198 are also configured to receive and output DC power from the battery packs 86, 90, for example, when the transformer, the DC power input 214, and the battery 14 cannot provide sufficient power. For example, if the state of charge of the battery 14 is insufficient (i.e., the state of charge of the battery 14 is below a voltage threshold) or the battery 14 is removed, and the power device 10 is disconnected from an external power source, the battery packs 86, 90 provide power to the DC power output connectors 194, 198 and/or the AC power output connector 202 (via the inverter 246). In the illustrated embodiment, the first DC power output connector 194 provides a 12 volt output and is in the shape of a cigarette lighter, as typically seen in vehicles. In other embodiments, the first DC output connector 194 may provide a different voltage and/or may have a different type of connection. In the illustrated embodiment, the second DC output connector 198 includes two Universal Serial Bus (USB) ports to provide power (e.g., 5 V) to a peripheral device such as, for example, a tablet computer, a radio, a smartphone, and the like. In other embodiments, the second DC output 198 may be in the form of a different port, for example a micro-USB port or a coaxial power plug.

The AC output connector 202 includes two AC output connectors (e.g., AC plug receptacles). The AC output connector 202 is coupled to the AC power input 222 and to the inverter 246. The AC power output connector 202 receives AC power from one of the AC power input 222 and the inverter 246. The AC power output connector 202 provides AC power to an AC-powered peripheral device. The AC output switch 206 controls when power is accessible through the AC output connector 202 while the AC indicator 210 lights up to indicate when power is accessible through the AC output connector 202. Thus, a peripheral device can connect to the power device 10 through the DC power output connectors 194, 198 or the AC power output connector 202. The power device 10 can then provide power to the peripheral device for charging a battery of the peripheral device and/or powering the peripheral device. In the illustrated embodiment, the power device 10 also includes the power switch 250 (see FIG. 13) with an on position and an off position to enable and disable, respectively, a feature of the power device 10. For example, in FIG. 1, the AC output switch 206 is a power switch 250 that selectively enables and disables the AC output connector 202. In other embodiments, the power switch 250 selectively enables and disables the power device 10 in general, and in yet other embodiments, the power switch 250 selectively enables and disables the charging of the battery 14, the charging of battery packs 86, 90, or the first and second DC output connectors 194, 198.

The power device 10 operates in an AC mode, a DC mode, and a standalone mode. The power device 10 is operable to charge the battery 14 and the battery packs 86, 90 in the AC mode and the DC mode. The power device 10 is operable to supply power to a peripheral device in the AC mode, the DC mode, and the standalone mode. In the AC mode, the power device 10 receives AC power from the AC power input 222. The power device 10 is then operable to forward the received AC power to the AC power output connector 202 to power a coupled AC-powered peripheral device. The power device 10 is also operable to rectify the received AC input power using the transformer 238. The resulting DC power is provided to the first charging circuit 242 to charge the battery packs 86, 90, to the second charging circuit 244 to charge the battery 14, and to power DC-powered peripheral devices, if present, via one of the first and the second DC power output connectors 194, 198.

In the DC mode, the power device 10 receives power from an external DC power source through the DC power input 214. The DC power input 214 provides power to a DC-powered peripheral device via the first DC output connector 194 and the second DC output connector 198. Additionally, the DC input power is received by the inverter 246, which inverts the power to provide AC power to AC-powered devices, if present, via the AC output connector 202. Furthermore, in the DC mode, power from the DC power input 214 is provided to the first charging circuit 242 to charge the battery packs 86, 90, if present, and to the second charging circuit 244 to charge the battery 14, if present.

In the standalone mode, the power device 10 is coupled to the battery 14, but is not connected to an AC or DC external power source via AC power input 222 or DC power input 214, respectively. Accordingly, the battery 14 is not charged in the standalone mode. However, the battery 14 (a) provides DC power to the inverter 246, which is inverted and provided to AC peripheral devices coupled to the AC power output connector 202, (b) provides DC power to the first DC output connector 194 and to the second DC output 198 to power DC peripheral devices coupled to the DC power output connectors 194, 198, and (c) provides DC power to the first charging circuit 242 to charge the battery packs 86, 90. Thus, the power device 10 and battery 14 operate together as a portable power supply for battery packs 86, 90, and both AC and DC devices.

In some embodiments, in the standalone mode, the power device is coupled to one of the first battery pack 86 and the second battery pack 90, but is not connected to the battery 14 or to an AC or DC external power source via AC power input 222 or DC power input 214, respectively. Accordingly, the first battery pack 86 and the second battery pack 90 are not charged in this standalone mode. However, the battery packs 86, 90 (a) provide DC power to the inverter 246, which is inverted and provided to AC peripheral devices coupled to the AC output connector 202, and (b) provide DC power to the first DC output connector 194 and to the second DC output connector 198 to power DC peripheral devices coupled to the DC power output connectors 194, 198. Thus, the power device 10 and the battery packs 86, 90 operate together as a portable power supply for both AC and DC devices.

In some embodiments, in the standalone mode, the power device 10 is coupled to the first battery pack 86, the second battery pack 90, and to the battery 14, but the battery 14 is either not functioning or depleted. In such embodiments, the first battery pack 86 and the second battery pack 90 provide power to AC and DC peripheral devices as described above, and provide DC power to the second charging circuit 244 to charge the battery 14. In some situations, one of the battery packs 86, 90 is also depleted (e.g., the first battery pack 86). In such situations, the remaining battery pack 86, 90 (e.g., the second battery pack 90) provides power to the first charging circuit 242 to charge the depleted battery pack (e.g., the first battery pack 86), and to the second charging circuit 244 to charge the battery 14, as well as to any desired AC or DC outputs.

Figure 14:
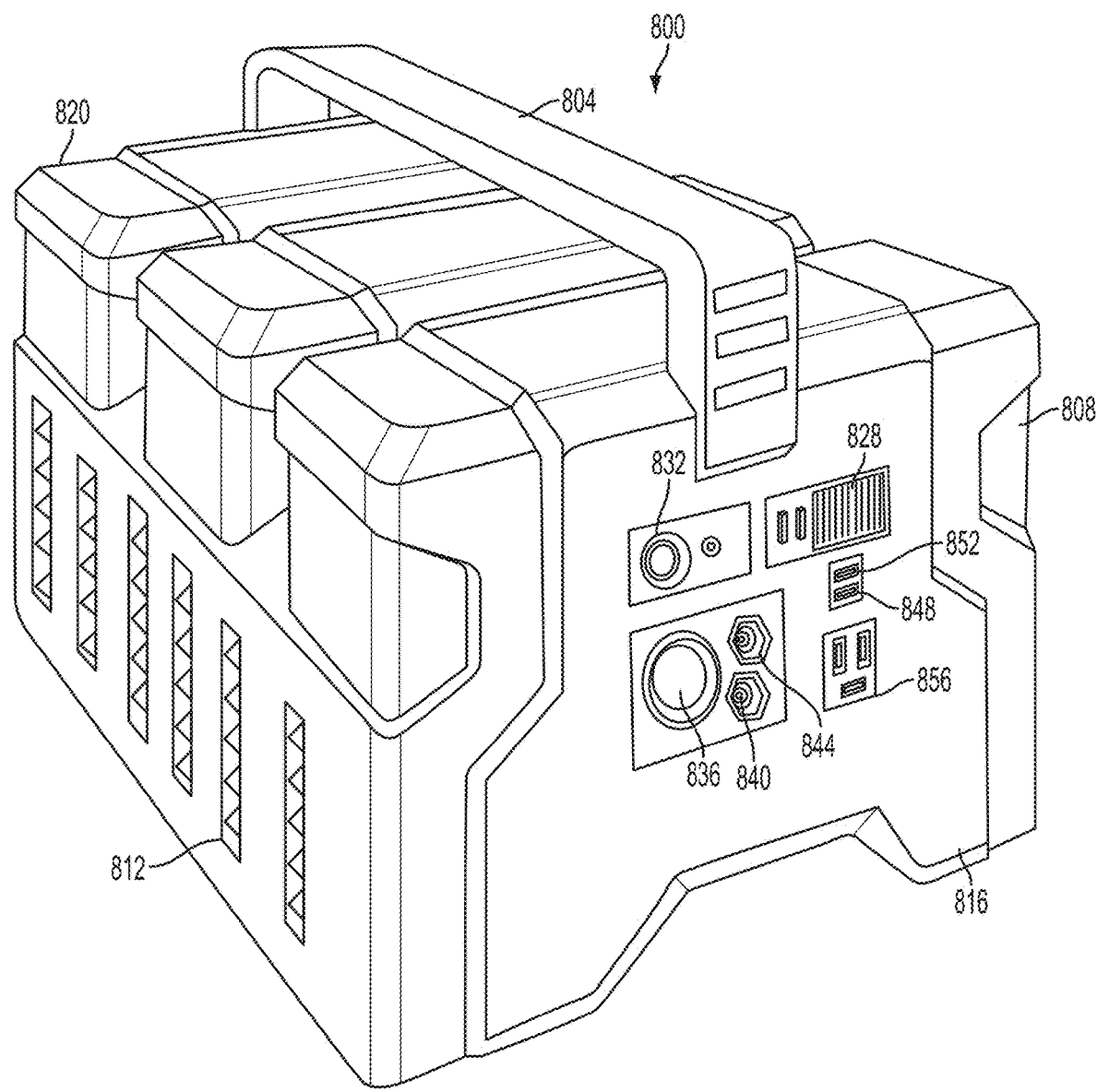
FIG. 14 illustrates a power supply device in a first position according to a second embodiment of the invention.
Figure 15:
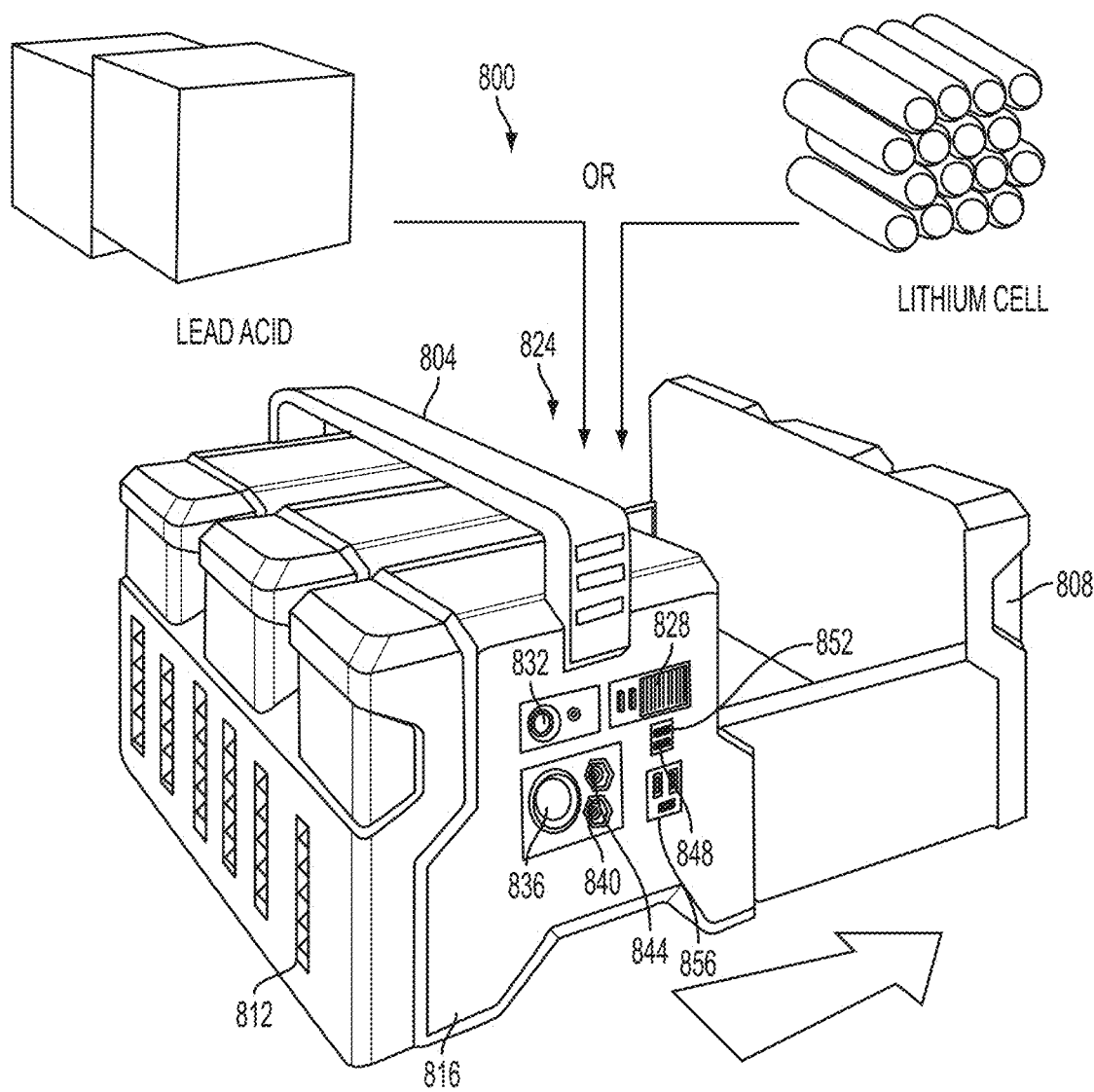
FIG. 15 illustrates the power supply device of FIG. 14 in a second position.

FIGS. 14-15 illustrate a different power device 800. The power device 800 includes a handle 804, a first side portion 808, a second side portion 812, a front portion 816, and a back portion 820. The first side portion 808 is movable between a closed position (FIG. 14) and an opened position (FIG. 15). When the first side portion 808 is in the opened position, a compartment 824 becomes accessible. The compartment 824 is configured to receive different types of battery cells or battery packs. For example, a user may insert a lead acid battery, one or more power tool packs, or several lithium battery cells, in the compartment 824. The interior of the compartment includes the appropriate electrical connectors to properly receive different types of batteries. On the front portion 816, the power device 800 includes a solar panel input 828, an AC input 832, three DC inputs 836, 840, 844. With reference to FIG. 13, the solar panel input 828 and the DC inputs 836, 840, 844 are represented with DC input 214. The power device 800 also includes two DC power outputs 848, 852 (first and second DC power output connectors 194, 198 of FIG. 13), and an AC power output 856 (AC output connector 202 of FIG. 13). The other operations of the power device 800 are similar to that described with reference to the power device 10. If multiple power inputs are connected and operable to provide power to the power device 10, 800, the controller 234 is operable to select one for supplying power according to a predetermined priority schedule. Alternatively, additional circuitry may be provided so that the power device 10, 800, can use multiple power sources simultaneously.

Figure 16A:
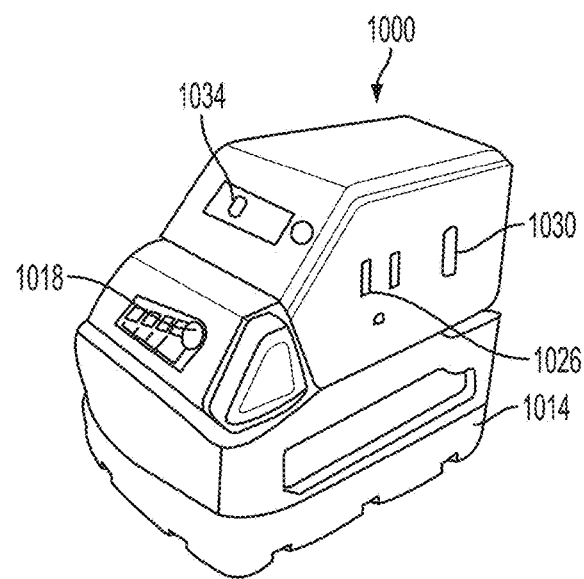
FIGS. 16A-16C illustrate a battery charger and power supply device according to a third embodiment of the invention.
Figure 16B:
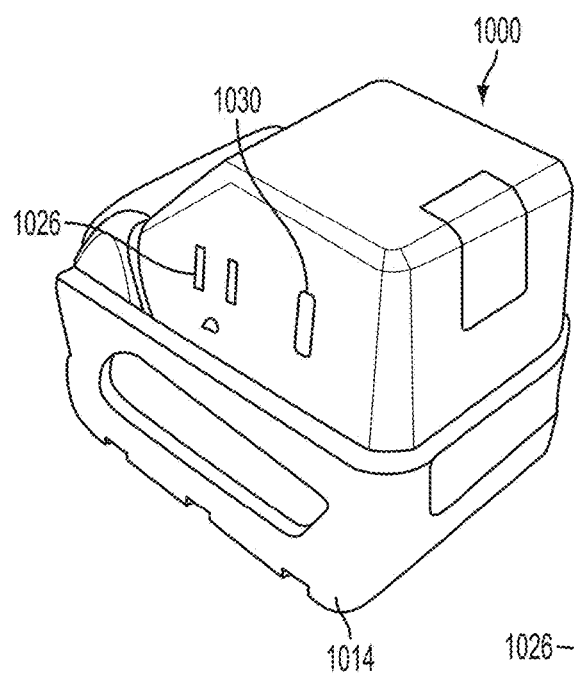
Figure 16C:
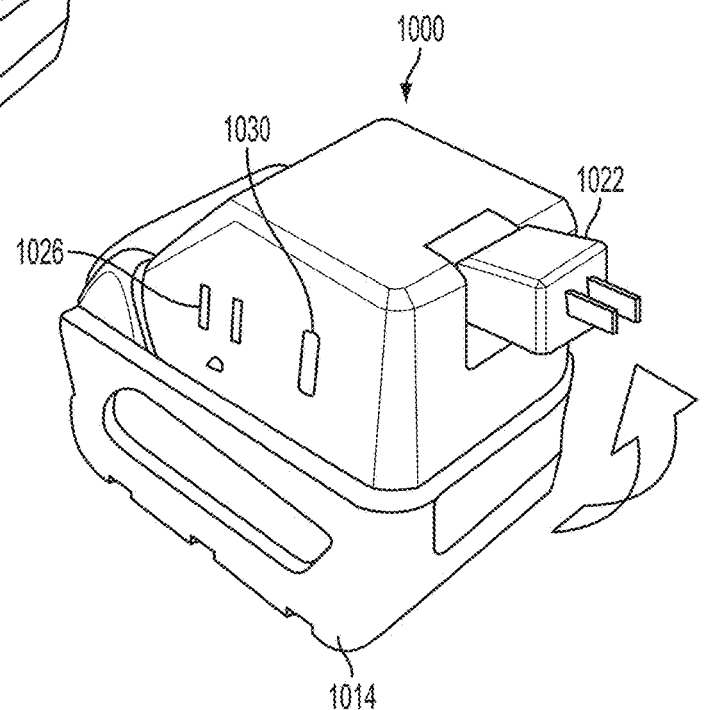

FIGS. 16A-C illustrate another embodiment of a battery charger and power supply device 1000. The battery charger and power supply device 1000 (hereinafter referred to simply as a "power device") connects to and is supported by a battery pack 1014. The power device 1000 is configured to receive power from an external power source and use the power to charge the battery pack 1014. The power device 1000 is also configured to use the power from the power source to power a peripheral device. The peripheral device may be a smartphone, a tablet computer, a laptop computer, a portable music player, and the like. The power source may be a DC power source, for example, a vehicle battery, or the power source may be an AC power source, for example, a conventional wall outlet. Additionally, the power device 1000 is configured to use the power from the battery pack 1014 to power a peripheral device. The power device includes an inverter to invert DC power from the battery pack 1014 to AC power for powering AC-powered peripheral devices.

The power device 1000 connects to the battery pack 1014. In the illustrated embodiment, the battery pack 1014 is an 18 Volt battery pack. In other embodiments, the capacity of the battery pack 1014 may be different. For example, the battery pack can be a 4 volt battery pack, 12 volt battery pack, 40 volt battery pack, or another voltage. In the illustrated embodiment, the battery pack 1014 includes lithium ion battery cells. In other embodiments, the battery pack 1014 may be of a different chemistry, for example, nickel-cadmium, nickel-hydride, and the like.

The battery pack 1014 is a power tool battery pack generally used to power a power tool, such as an electric drill, an electric saw, and the like. In some embodiments, the battery pack 1014 includes a microcontroller that monitors characteristics of the battery pack 1014. For example, the microcontroller may monitor the state of charge of the battery pack 1014, the temperature of the battery pack 1014, or other characteristics relevant to the battery pack 1014. The microcontroller may also control aspects of charging and/or discharging of the battery pack 1014. In the illustrated embodiment, the battery pack 1014 also includes an indicator 1018 on the face of the battery to display the current state of charge of the battery pack 1014. In the illustrated embodiment, the indicator 1018 includes a plurality of LEDs. As the state of charge of the battery pack 1014 increases, more LEDs light up and as the state of charge of the battery pack 1014 decreases less LEDs light up. The battery pack 1014 may include a different type of indicator to display the state of charge of the battery. For example, the indicator 1018 may include a single LED that lights up only when the battery pack 1014 is fully charged. In other embodiments, the battery pack 1014 does not include an indicator.

The battery pack 1014 also includes terminals to connect to the power device 1000. The terminals for the battery pack 1014 include a positive and a negative terminal to provide power to and from the battery pack 1014. In some embodiments, the battery pack 1014 also includes a temperature terminal to monitor the temperature of the battery pack 1014 or of the power device 1000. In some embodiments, the battery pack 1014 also includes data terminals to communicate with a portable device receiving power from the battery pack 1014 and with the power device 1000. For example, the battery pack 1014 may include a microcontroller to monitor one or more characteristics of the battery pack 1014 and the data terminals may communicate with the power device 1000 regarding the monitored characteristics.

The power device 1000 includes terminals (not shown) that connect to the terminals of the battery pack 1014. A latching mechanism on the battery pack 1014 (see FIG. 1) and power device 1000 is used to reliably and selectively secure the two components together. The power device 1000 includes a positive and a negative terminal for receiving and providing power to the battery pack 1014. In some embodiments, the power device 1000 also includes a temperature terminal for measuring the temperature of one of the battery pack 1014 and the power device 1000. The power device 1000 can also include data terminals for communicating with the battery pack 1014.

In the illustrated embodiment, the power device 1000 includes a power source input 1022. The power source input 1022 is an AC plug that flips up to expose power terminals and can flip down when it is not in use. The AC plug 1022 connects to an AC power source and provides AC power to the power device 1000. In the illustrated embodiment, the power device 1000 also includes a DC power output 1030 and an AC power output 1026. The DC power output 1030 is a USB port. In other embodiments, the DC power output 1030 can be in the form of a different port, for example a micro-USB port or a coaxial power plug. A peripheral device can connect to the power device 1000 through the DC power output 1030 or the AC power output 1026. The power device 1000 can then provide power to the peripheral device for charging a battery of the peripheral device and/or powering the peripheral device. In the illustrated embodiment, the power device 1000 also includes a power switch 1034 with an on position and an off position to enable and disable, respectively, a feature of the power device 1000. For example, in FIG. 1, the power switch 1034 selectively enables and disables the AC power output 1026. In other embodiments, the power switch 1034 selectively enables and disables the power device 1000 in general, and in yet other embodiments, the power switch 1034 selectively enables and disables the charging of the battery pack 1014 or the DC power output 1030.

Figure 17:
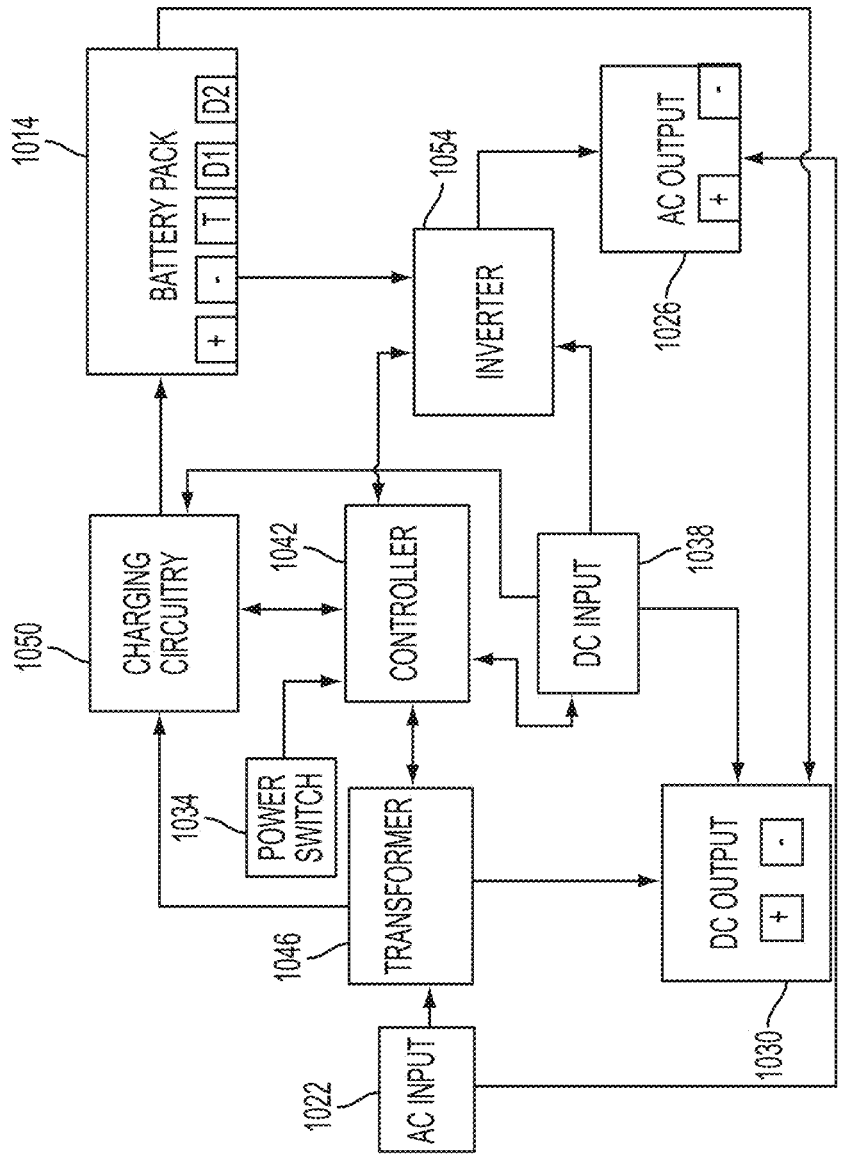
FIG. 17 illustrates a schematic diagram of the power device of FIGS. 16A-C.

As shown in FIG. 17, the illustrated power device 1000 includes an AC power input 1022, a DC power input 1038, a controller 1042, a transformer 1046, a charging circuit 1050, an inverter 1054, a power switch 1034, an AC output 1026, and a DC output 1030. The AC power input 1022 receives AC power from an external power source, for example, a wall outlet. The AC power input 1022 is electrically connected to the AC output 1026 for forwarding AC power to a peripheral device. The AC power input 1022 is also electrically connected to the transformer 1046. The transformer 1046 is electrically connected to the AC power input 1022, the DC power output 1030, the charging circuit 1050, and the controller 1042.

The transformer 1046 receives AC power from the AC power input 1022 and converts the AC power to DC power. The transformer 1046 sends a control signal to the controller 1042 to indicate that power is provided through the AC power input 1022. The transformer 1046 provides the DC power to the charging circuit 1050 to charge the battery pack 1014. The transformer 1046 also provides the DC power to the DC output 1030 to provide power to a peripheral device. The DC output by the transformer 1046 may be at different voltage levels for different components. For example, the transformer 1046 may provide 18 volts for the charging circuit 1050 and 5 volts for the DC output 1030.

The DC power input 1038 receives DC power from an external source, for example, a vehicle battery. The DC power input 1038 is connected to the DC power output 1030, the inverter 1054, the charging circuit 1050, and the controller 1042. The DC power input 1038 sends a control signal to the controller 1042 to indicate that power is provided through the DC power input 1038. The power input 1038 transfers the DC power to the charging circuit 1050 to charge the battery pack 1014. The power input 1038 also transfers DC power to the DC power output 1030 to provide power for a peripheral device. The DC power input 1038 is also electrically connected to the inverter 1054. Although not shown, one or more DC-to-DC converters may be provided to receive and step down or up the DC input voltage to a level appropriate for the various components receiving the DC input voltage. For instance, the DC input 1038 may receive 12 volts DC, which is converted to 18 volts for the charging circuit 1050 and converted to 5 volts for the DC output 1030.

The inverter 1054 is connected to the DC power input 1038, the battery pack 1014, the AC power output 1026, and the controller 1042. The inverter 1054 converts the DC power from the DC power input 1038 and from the battery pack 1014 to AC power. The inverter 1054 transfers the AC power to the AC power output 1026 to provide power to a peripheral device. The inverter 1054 is also connected to the controller 1042 to receive instructions from the controller. In the illustrated embodiment, the controller 1042 is connected to a power switch 1034 for the inverter 1054. In some embodiments, the power switch 1034 determines whether the inverter 1054 is currently functioning. In such embodiments, the controller 1042 determines the position of the power switch 1034 (on or off) and instructs the inverter to turn on or off. In other embodiments, the power switch 1034 is directly connected to the inverter 1054 such that when the power switch 1034 is open, the inverter does not function and when the power switch is closed, the inverter 1054 functions. In yet other embodiments, the power switch 1034 controls the operation of other aspects of the power device 1000, as discussed above.

The charging circuit 1050 is electrically connected to the controller 1042, the transformer 1046, the DC power input 1038, and to the battery pack 1014. The charging circuit 1050 controls the charging scheme for the battery pack 1014. In some embodiments, the charging circuit 1050 varies a charging current based on the temperature of the battery pack 1014, the state of charge of the battery pack 1014, the amount of time the battery pack 1014 has been charging, requests from the battery pack 1014, and other factors. The charging circuit 1050 receives DC power from one of the transformer 1046 and the DC power input 1038. The charging circuit 1050 sends and receives information regarding the charging scheme for the battery pack 1014 to and from the controller 1042. For example, the charging circuit 1050 may communicate to the controller 1042 information about the present charging current used to charge the battery pack 1014.

The controller 1042 is electrically connected to the transformer 1046, the DC power input 1038, the inverter 1054, the power switch 1034, and the charging circuit 1050. The controller 1042 receives indication signals from the transformer 1046 and from the DC power input 1038 indicating that power is received through one of the transformer 1046 and the DC power input 1038. In some instances, the controller 1042 is also operable to control the transformer 1046 and/or the DC input 1038 to control power conversion and/or power output levels. The controller also receives and sends control signals to the inverter 1054. In the illustrated embodiment, the controller is connected to a power switch 1034. The power switch 1034, in some embodiments, controls the inverter 1054. In such embodiments, the controller 1042 sends control signals to the inverter depending on the position of the power switch 1034. In other embodiments, the power switch 1034 controls the charging circuit 1050. In such embodiments, the controller 1042 sends control signals to the charging circuit 1050 to start or stop charging the battery pack 1014. The controller 1042 includes a processor and memory storing software executed by the processor to effect the functionality of the controller 1042 described herein.

The AC output 1026 is connected to the AC power input 1022 and to the inverter 1054. The AC power output 1026 receives AC power from one of the AC power input 1022 and the inverter 1054. The AC power output 1026 provides AC power to a peripheral device. The DC power output 1030 is connected to the transformer 1046, the DC power input 1038, and the battery pack 1014. The DC power output 1030 receives DC power from one of the transformer 1046, the DC power input 1038, and the battery pack 1014. The DC power output 1030 is configured to receive and output DC power from the battery pack 1014 when the transformer 1046 and the DC power input 1038 are not receiving power from an external power source.

The power device 1000 operates in an AC mode, a DC mode, and a standalone mode. The power device 1000 is operable to charge the battery pack 1014 in the AC mode and the DC mode. The power device 1000 is operable to supply power to a peripheral device in the AC mode, the DC mode, and the standalone mode. In the AC mode, the power device 1000 receives AC power from the AC power input 1022. The power device 1000 is then operable to forward the received AC power to the AC power output 1026 to power a coupled AC-powered peripheral device. The power device 1000 is also operable to rectify the received AC input power using the transformer 1046. The resulting DC power is provided to the charging circuit 1050 to charge the battery pack 1014, if present, and to power DC-powered peripheral devices, if present, via DC power output 1030.

In the DC mode, the power device 1000 receives power from an external DC power source through the DC power input 1038. The DC power input 1038 provides power to a DC-powered peripheral device via the DC output 1030. Additionally, the DC power input 1038 is received by the inverter 1054, which inverts the power to provide AC power to AC-powered devices, if present, via the AC output 1026. Furthermore, in the DC mode, power from the DC power input 1038 is provided to the charging circuit 1050 to charge the battery pack 1014, if present.

In the standalone mode, the power device 1000 is coupled to the battery pack, but is not connected to an AC or DC external power source via AC power input 1022 or DC power input 1038, respectively. Accordingly, the battery pack 1014 is not charged in the standalone mode. However, the battery pack 1014 (a) provides DC power to the inverter 1054, which is inverted and provided to AC peripheral devices coupled to the AC power output 1026, and (b) provides DC power to the DC output 1030 to power DC peripheral devices coupled to the DC power output 1030. Thus, the power device 1000 and battery pack 1014 operate together as a portable power supply for both AC and DC devices.

Figure 18:
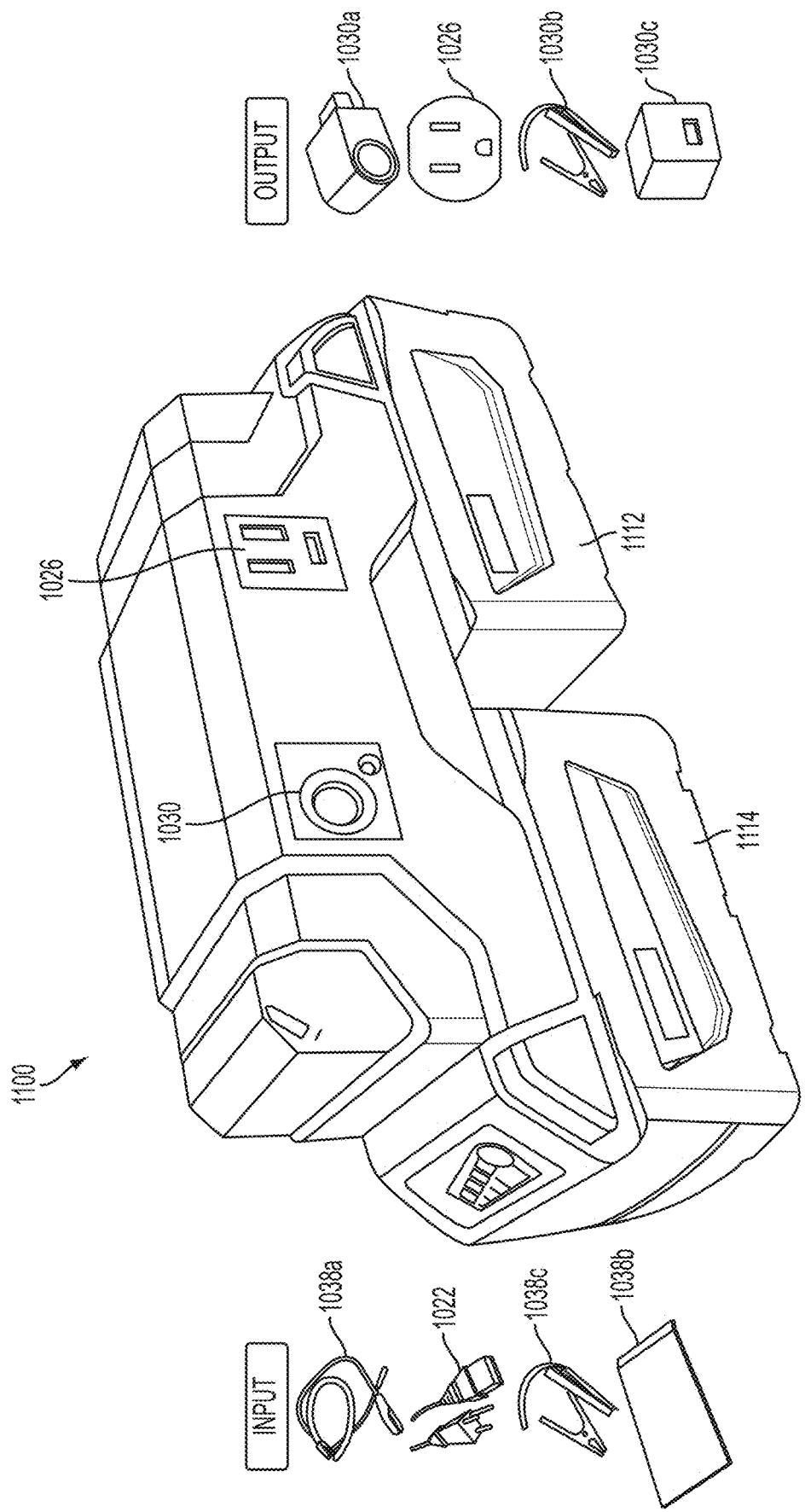
FIG. 18 illustrates a power device according to a third embodiment of the invention.

FIG. 18 illustrates a different power device 1100. The power device 1100 functions similar to the power device 1000 and like parts have been given the same part number. As shown in FIG. 18, the power device 1100 connects to two battery packs 1112, 1114, which are similar to battery pack 1014. The power device 1100 includes a DC power input 1038, an AC power input 1022, a DC power output 1030, and an AC power output 1026. The connector shown as the DC power output 1030 may, in some embodiments, be used instead as the DC power input 1038. As shown in FIG. 18, the DC power input 1038 may be a cigarette lighter adapter 1038*a*, a solar panel 1038*b*, or connector clips 1038*c* to attach directly to a battery, such as a car battery. The DC power output may be a cigarette lighter adapter 1030a, connector clips 1030b for connecting directly to a battery (e.g., a vehicle battery), or a port (e.g., a USB port) for connecting to a peripheral device. The power device 1100 includes two battery receptacles to receive the two battery packs 1112, 1114. In some embodiments, the power device 1100 charges the battery packs 1112, 1114 sequentially. In other words, the power device 1100 charges a first battery pack 1112 until the battery pack 1112 is completely charged, and then the power device 1100 charges the second battery pack 1114 until the second battery pack 1114 charges completely. In other embodiments, the power device 1100 includes more input ports and/or more output ports on a different portion of the power device 1100. In other embodiments, the power supply 1038, 1022 and the battery packs 1112, 1114 may be coupled in parallel, in series, or sequentially (one at a time, switching when drained). The other operations of the power device 1100 to charge the battery packs 1112, 1114 and to provide power through the power outputs 1026, 1030 are similar to that described with reference to the power device 1000.

Figure 19:
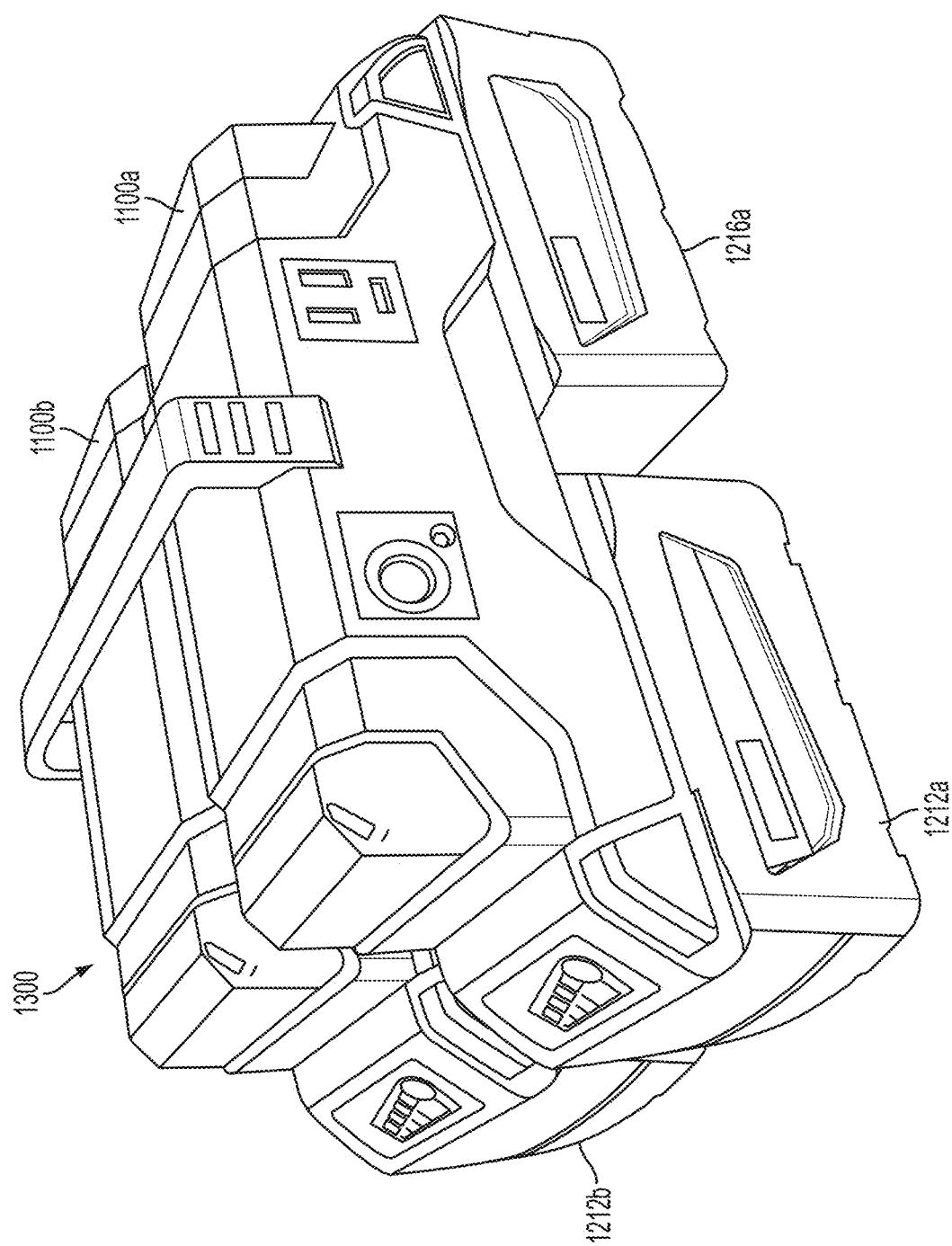
FIG. 19 illustrates a power device according to a fourth embodiment of the invention.

FIG. 19 illustrates a different power device 1300. The power device 1300 includes two power devices 1100a, 1100b coupled together with a handle 304. The two power devices 1100a, 1100b are similar to the power device 1100 described above. The two power devices 1100a, 1100b are also electrically connected to share use of some of the components. For example, the two power devices 1100a, 1100b are electrically connected such that the power device 1300 only requires one power input to charge the battery packs 1212a, 1212b, 1216a, and a fourth pack that is out of view in FIG. 19, but is across from battery pack 1212b. The electrical connection may be, for example, placed in between the power devices 1100a, 1100b and is, therefore, hidden from view in FIG. 19. The other operations of the power device 1300 are substantially the same as that described with reference to the power device 1100.

Figure 20:
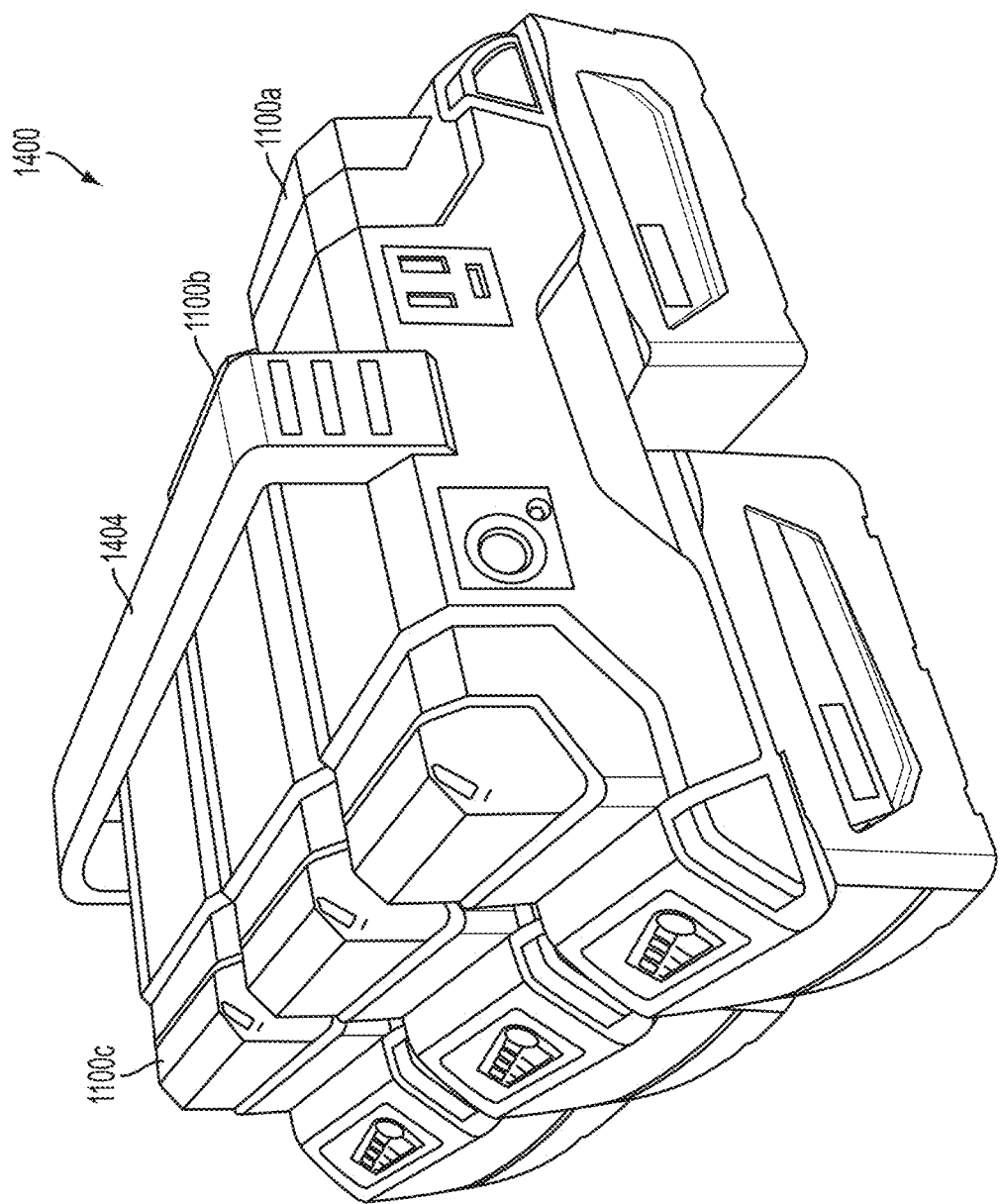
FIG. 20 illustrates a power device according to fifth embodiment of the invention.

FIG. 20 illustrates a different power device 1400. The power device 1400 includes three power devices 1100a, 1100b, 1100c, which are individually similar to the power device 1100. The three power devices are held together with a handle 1404 and each receive two power tool battery packs. The three power devices 1100a, 1100b, 1100c are also electrically connected to share use of some of the components, as described above with reference to power device 1300. The other operations of the power device 1400 are similar to that described with reference to the power device 1300.

Figure 21:
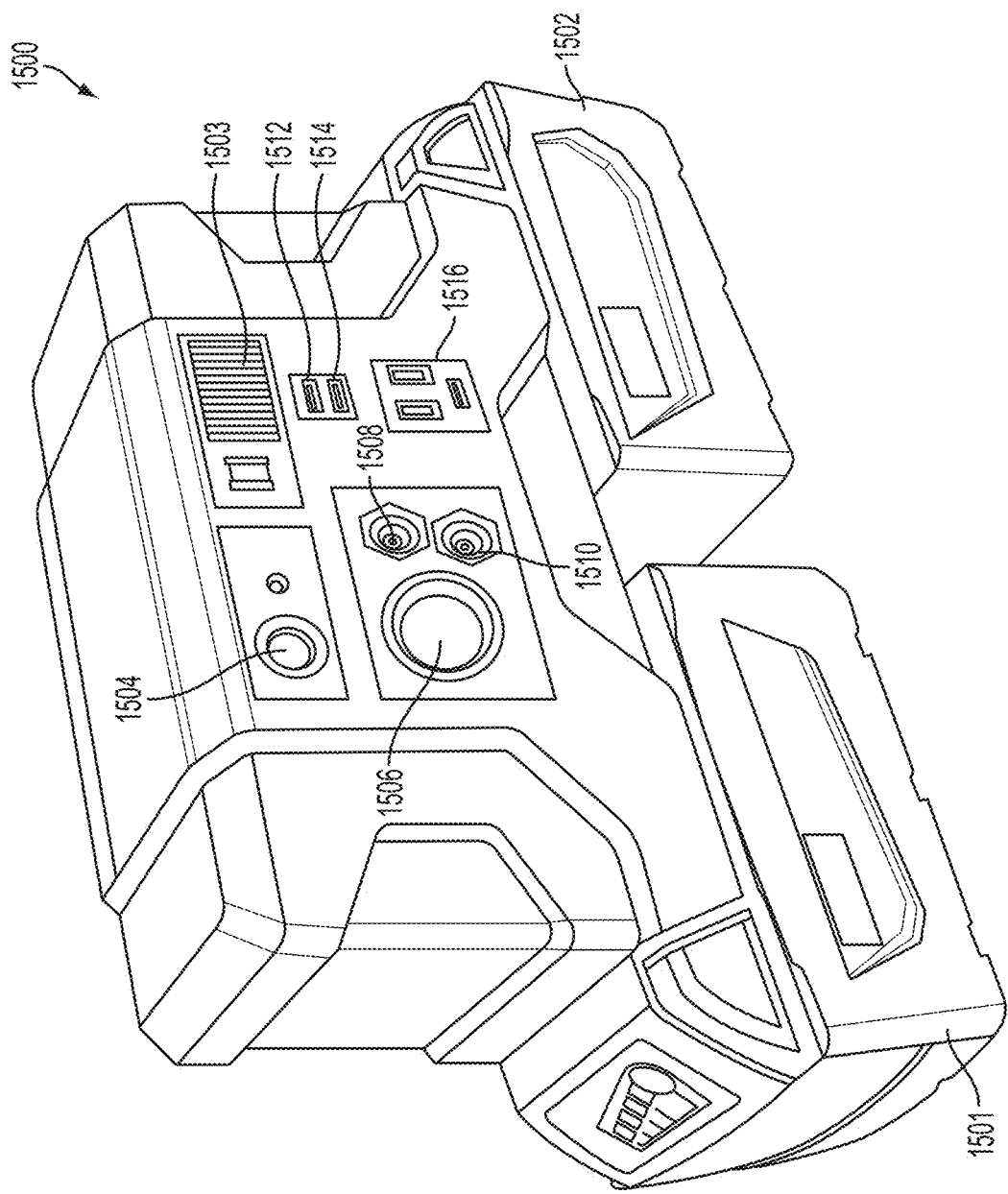
FIG. 21 illustrates a power device according to a sixth embodiment of the invention.

FIG. 21 illustrates a different power device 1500. The power device 1500 connects to two battery packs 1501, 1502. The power device 1500 includes a solar panel input 1503, an AC input 1504, three DC inputs 1506, 1508, 1510. The power device 1500 also includes two DC power outputs 1512, 1514, and an AC power output 1516. With reference to FIG. 17, the solar panel input 1503 and the DC inputs 1506, 1508, 1510 are DC inputs 1038; the AC input 1504 is an AC input 1022, the AC power output 1516 is an AC output 1026, and the DC outputs 1512, 1514 are DC outputs 1030. The other operations of the power device 1500 are similar to that described with reference to the power device 1100.

Figure 22:
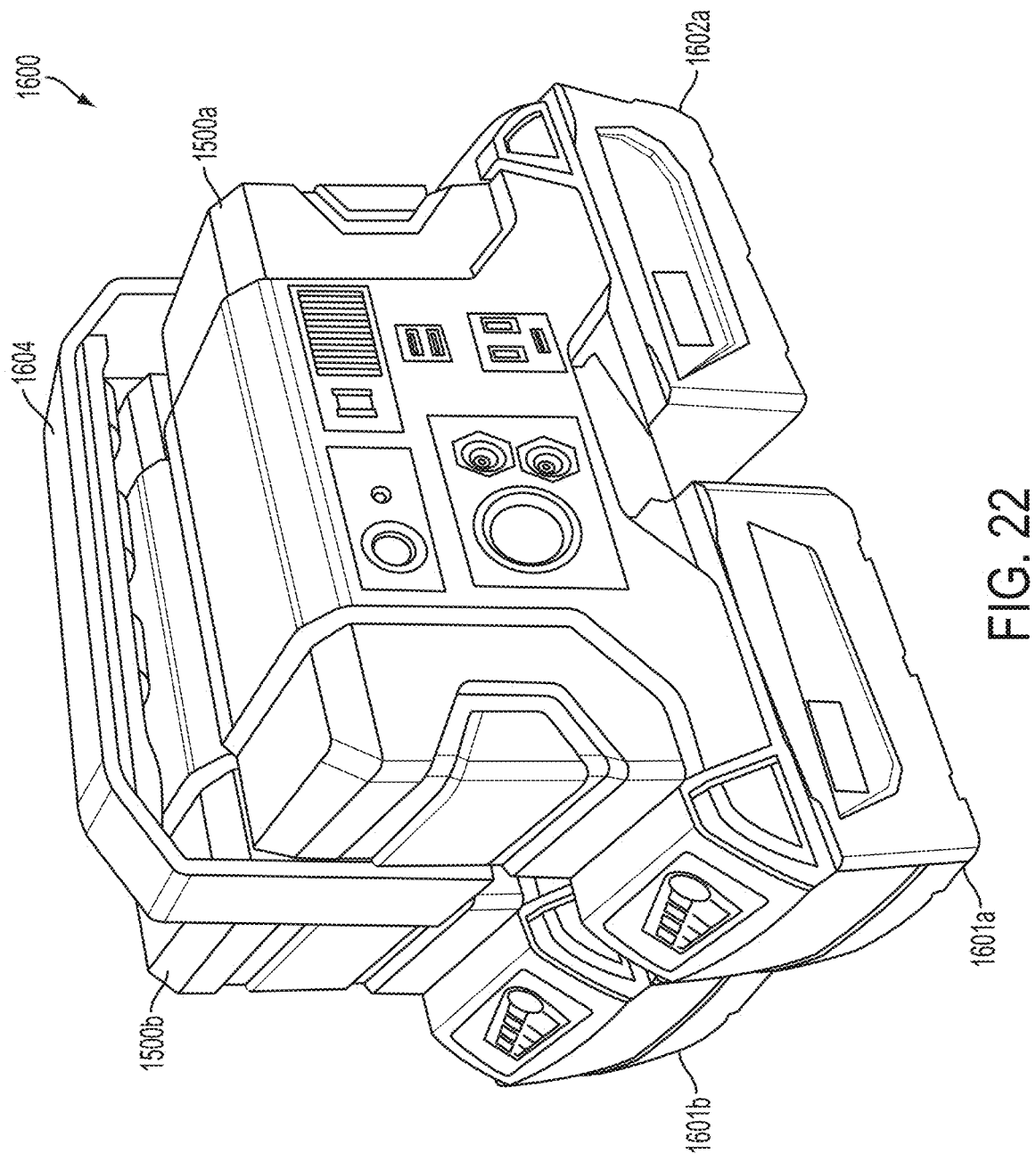
FIG. 22 illustrates a power device according to a seventh embodiment of the invention.

FIG. 22 illustrates a different power device 1600. The power device 1600 connects to four batteries, three of which are visible in FIG. 22 (battery packs 1601a, 1601b, and 1602a). The power device 1600 includes two power devices 1500a, 1500b, which are similar to the power device 1500 described above. The two power devices 1500a, 1500b are coupled together with a handle 1604. The two power devices 1500a, 1500b are also electrically connected to share use of some of the electrical components. For example, the two power devices 1500a, 1500b are electrically connected such that the power device 1600 only requires one power input to charge the battery packs 1601a, 1601b, 1602a, 1602b. The electrical connection may be, for example, placed between the power devices 1500a, 1500b. The other operations of the power device 1600 are similar to that described with reference to the power device 1500.

Figure 23:
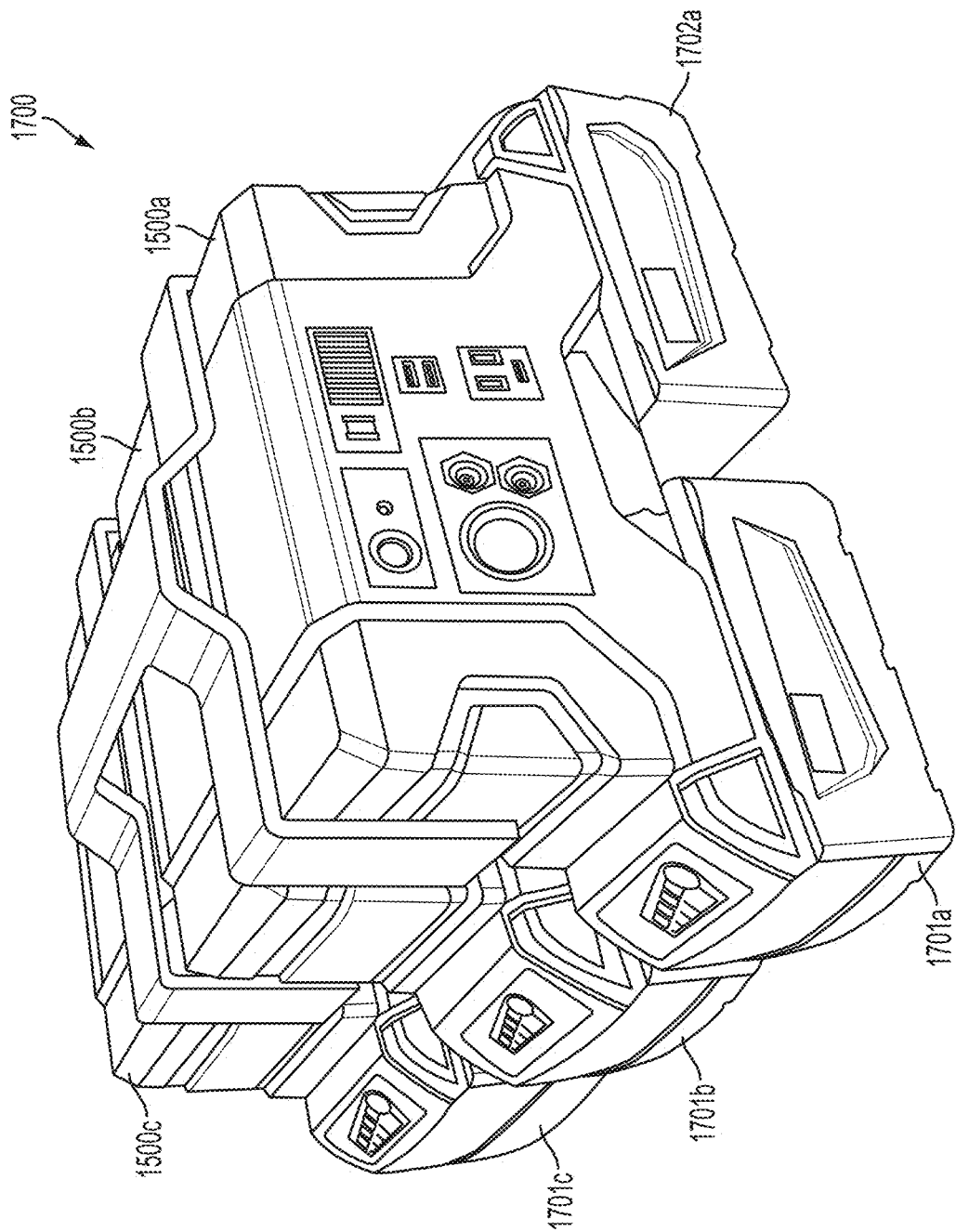
FIG. 23 illustrates a power device according to an eighth embodiment of the invention.

FIG. 23 illustrates a different power device 1700. The power device 1700 connects to six battery packs, four of which are visible in FIG. 23 (battery packs 1701a, 1701b, 1701c, and 1702a). The power device 1700 includes three power devices 1500a, 1500b, 1500c coupled together with a handle 1704. The three power devices 1500a, 1500b, 1500c are also electrically connected to share use of some of the components, as described above with reference to power device 1600. The other operations of the power device 1700 are similar to that described with reference to the power device 1600.

FIG. 24 illustrates a different power device 1800. The power device 1800 is configured to receive two battery packs 1804, 1808 and to charge different types of batteries having different voltage outputs. The first battery pack 1804 is an 18 volt, slide-on style battery pack. The second battery pack 1808 is a 12 volt, tower style battery pack. In other embodiments, the power device 1800 is designed for other types and quantities of battery packs. The power device 1800 is configured to charge different types of battery packs and provide a power output to a peripheral device through a DC power output 1212 and an AC power output 1216. In the illustrated embodiment, the power device 1800 includes a DC power input 1820 that connects to a 12V outlet from a vehicle battery and an AC power input 1824 that connects to a wall outlet.

In some embodiments, the power devices 1100, 1300, 1400, 1500, 1600, and 1700 are supported by one or more battery pack(s) coupled thereto. In other embodiments, the power devices 1100, 1300, 1400, 1500, 1600, and 1700 include base feet that extend downward and support the power devices in conjunction with the bases of the battery packs. Accordingly, looking to FIG. 23 as an example, if battery packs 1701a, 1701b, and 1701c are removed, the power device 1700 will not tip over but, rather, will be supported by any remaining battery packs on the opposite side of the power device 1700 and base feet of the power device 1700. Additionally, if all of the battery packs of the power device 1700 are removed, the power device 1700 will remain elevated by the base feet approximately the height of a battery pack.

Thus, the invention provides, among other things, a power device configured to provide power to charge battery packs and provide AC and DC power to a peripheral device. Various features and advantages of the invention are set forth in the following claims.

What is claimed is:
1. A portable power source comprising:
a housing;
a first power tool battery pack port formed in the housing and configured to supportably receive a first power tool battery pack;
a receptacle formed in the housing and configured to supportably receive an energy storage device, the energy storage device not configured to be received by the first power tool battery pack port;

a power output panel including an alternating current ("AC") output connecter for providing AC power to a peripheral device;

an inverter electrically connected to the first power tool battery pack port, the energy storage device, and the AC output;

circuitry configured to connect one of the first power tool battery pack port and the energy storage device for supplying power to the inverter; and a controller including an electronic processor, the controller configured to:
  control the circuitry to provide direct current ("DC") power from the energy storage device to the inverter when a state of charge of the energy storage device is above a first voltage threshold, and
  control the circuitry to provide DC power from the first power tool battery pack port to the inverter when the state of charge of the energy storage device is below the first voltage threshold or the energy storage device is disconnected from the receptacle.

2. The portable power source of claim 1, wherein an energy storage capacity of the first power tool battery pack is less than an energy storage capacity of the energy storage device.

3. The portable power source of claim 1, wherein the energy storage device includes battery cells of a first chemistry and the first power tool battery pack includes battery cells of a second chemistry.

4. The portable power source of claim 1, wherein the energy storage device includes battery cells of a first type and the first power tool battery pack includes battery cells of a second type.

5. The portable power source of claim 1, further comprising a second power tool battery pack supportably received at a second power tool battery pack port.

6. The portable power source of claim 5, wherein the energy storage device is not configured to be received by the second power tool battery pack port.

7. The portable power source of claim 5, wherein the energy storage device includes battery cells of a first chemistry, the first power tool battery pack includes battery cells of a second chemistry, and the second power tool battery pack includes battery cells of a third chemistry.

8. The portable power source of claim 5, wherein the first power tool battery pack includes battery cells of a first type and the second power tool battery pack includes battery cells of a second type.

9. The portable power source of claim 5, wherein the first power tool battery pack includes battery cells of a first chemistry and the second power tool battery pack includes battery cells of a second chemistry.

10. A method of operating a portable power source comprising:
  receiving a first power tool battery pack at a first power tool battery pack port supported by a housing of the portable power source;
  receiving an energy storage device at a receptacle formed in the housing of the portable power source, the energy storage device not configured to be received by the first power tool battery pack port;
  controlling, by a controller having an electronic processor, circuitry to provide direct current ("DC") power from the energy storage device to an inverter when a state of charge of the energy storage device is above a first voltage threshold;
  controlling, by the controller, circuitry to provide DC power from the first power tool battery pack to the inverter when the state of charge of the energy storage device is below the first voltage threshold or the energy storage device is disconnected from the receptacle;
  inverting, by the inverter, the received DC power to alternating current ("AC") power; and
  providing the AC power to an AC output.

11. The method of claim 10, wherein the energy storage device includes battery cells of a first chemistry and the first power tool battery pack includes battery cells of a second chemistry.

12. The method of claim 10, wherein the energy storage device includes battery cells of a first type and the first power tool battery pack includes battery cells of a second type.

13. The method of claim 10, further comprising receiving a second power tool battery pack at a second power tool battery pack port supported by the housing of the portable power source.

14. The method of claim 13, wherein the energy storage device is not configured to be received by the second power tool battery pack port.

15. The method of claim 13, wherein the energy storage device includes battery cells of a first chemistry, the first power tool battery pack includes battery cells of a second chemistry, and the second power tool battery pack includes battery cells of a third chemistry.

16. The method of claim 13, wherein the first power tool battery pack includes battery cells of a first type and the second power tool battery pack includes battery cells of a second type.

17. The method of claim 13, wherein the first power tool battery pack includes battery cells of a first chemistry and the second power tool battery pack includes battery cells of a second chemistry.

18. A portable power source comprising:
  a housing;
  a first power tool battery pack port formed in the housing configured to supportably receive a first power tool battery pack;
  a receptacle formed in the housing and configured to supportably receive an energy storage device, the energy storage device not configured to be received by the first power tool battery pack port;
  a power output panel including an alternating current ("AC") output connecter for providing AC power to a peripheral device;
  an inverter electrically connected to the first power tool battery pack port, the energy storage device, and the AC output;
  circuitry configured to connect one of the first power tool battery pack port and the energy storage device for supplying power to the inverter; and
  a controller including an electronic processor, the controller configured to:
    control the circuitry to simultaneously provide direct current ("DC") power from the energy storage device and the first power tool battery pack port to the inverter, and
    control the inverter to invert the DC power received from the energy storage device and the first power tool battery pack port to AC power provided to the AC output.

19. The portable power source of claim 18, wherein the energy storage device includes battery cells of a first chemistry and the first power tool battery pack includes battery cells of a second chemistry.

20. The portable power source of claim 18, wherein the energy storage device includes battery cells of a first type and the first power tool battery pack includes battery cells of a second type.

\* \* \* \* \*